(12) United States Patent
Tahara et al.

(10) Patent No.: US 8,276,997 B2
(45) Date of Patent: Oct. 2, 2012

(54) BRAKE SYSTEM FOR A MOTORCYCLE, AND MOTORCYCLE INCORPORATING SAME

(75) Inventors: Shuji Tahara, Saitama (JP); Masatsugu Nishimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 779 days.

(21) Appl. No.: 12/378,845

(22) Filed: Feb. 20, 2009

(65) Prior Publication Data
US 2009/0243380 A1 Oct. 1, 2009

(30) Foreign Application Priority Data

Mar. 31, 2008 (JP) .................................. 2008-091948

(51) Int. Cl.
*B60T 8/32* (2006.01)

(52) U.S. Cl. ........................ 303/137; 303/3; 303/113.4

(58) Field of Classification Search .................. 303/137, 303/157, 158, 113.4, 113.1, 119.2, 115.6, 303/3; 188/344; 180/219
See application file for complete search history.

(56) References Cited

U.S. PATENT DOCUMENTS 5,419,625 A * 5/1995 Iwase et al. ................ 303/116.1
2007/0188012 A1 * 8/2007 Hariu et al. ..................... 303/3
2007/0252430 A1 * 11/2007 Nishikawa et al. ......... 303/113.4
2009/0242725 A1 * 10/2009 Tanabe et al. ................. 248/562

FOREIGN PATENT DOCUMENTS

| JP | 63-017662 B2 | 4/1988 |
| JP | 02-011448 B2 | 1/1990 |
| JP | 07-88158 | 9/1995 |

* cited by examiner

*Primary Examiner* — Pamela Rodriguez
(74) *Attorney, Agent, or Firm* — Carrier Blackman & Associates, P.C.; William D. Blackman; Joseph P. Carrier

(57) ABSTRACT

In a brake-by-wire brake system for a motorcycle, a pressure regulator is interposed between a pressure-generating unit and a brake caliper to regulate an output hydraulic pressure of the pressure generator, and to apply the regulated hydraulic pressure to a brake caliper. The pressure regulator is controlled by a control unit, based on input from an applied operating force detector, to minimize or prevent influences of engine vibration and heat on the pressure regulator. The pressure regulator is arranged between an engine body and a fuel tank disposed in back of an intake system connected to and extending upwardly from a cylinder head of the engine body; where the intake system is disposed on an upper side of the engine body. The pressure regulator is flexibly supported, through a flexibly resilient case, by a support cage attached to a body frame.

16 Claims, 24 Drawing Sheets

BRAKE SYSTEM FOR A MOTORCYCLE, AND MOTORCYCLE INCORPORATING SAME

CROSS-REFERENCE TO RELATED APPLICATIONS

The present invention claims priority under 35 USC 119 based on Japanese patent application No. 2008-091948, filed on Mar. 31, 2008. The entire subject matter of this priority document, including specification, claims and drawings, is incorporated by reference herein.

BACKGROUND OF THE INVENTION

1. Field of the Invention

The present invention relates to a brake system for a motorcycle, and to a motorcycle incorporating the brake system. In one illustrative embodiment, the brake system includes an operating force detector, for detecting an amount of force applied to a manually operable brake operating element, an pressure-generating unit for generating hydraulic pressure independent of the brake operating element, and a pressure regulator unit, interposed between the pressure-generating unit and a brake caliper on a wheel of the motorcycle. The pressure regulator unit regulates a hydraulic pressure from the pressure-generating unit, and applies the regulated hydraulic pressure to the brake caliper. The brake system also includes a control unit for controlling operation of the pressure regulator unit, based on the amount of force detected by the operating force detector.

2. Description of the Background Art

A configuration in which a pressure regulator is mounted to a motorcycle body frame in back of an engine has been known, as described in Japanese Patent Publication No. Sho 63-17662 and Japanese Patent Publication No. Hei 7-88158.

Meanwhile, in the configuration described in the above-referenced Japanese Patent Publications, the influence of vibrations from the engine cannot be prevented from being exerted on the pressure regulator. In order to control the hydraulic pressure at the brake caliper with high accuracy, the influence of vibrations transmitted from the engine on the pressure regulator has to be substantially reduced or eliminated.

The present invention has been made in consideration of the above-mentioned circumstances. Accordingly, it is an object of the present invention to provide a brake system for a motorcycle, in which a hydraulic pressure regulator is substantially isolated from engine vibrations and heat.

SUMMARY OF THE INVENTION

In order to achieve the above objects, the present invention according to a first aspect thereof provides a brake system for a motorcycle. The brake system according to the first aspect includes an operating force detector for detecting an operating force of a manually operated brake operating element, an pressure-generating unit capable of generating a hydraulic pressure independently from an operation of the brake operating element, and a pressure regulator unit for regulating an output hydraulic pressure of the pressure-generating unit, and for applying the regulated hydraulic pressure to a brake caliper at a wheel of the motorcycle. The brake system according to the first aspect also includes a control unit for controlling the operation of the pressure regulator on the basis of a value detected by the operating force detector.

The pressure regulator unit is interposed between the pressure-generating unit and a brake caliper, and the pressure regulator is also disposed between an engine body, mounted on a body frame, and a fuel tank disposed in a location which is on the rear side of an intake system connected to and extending upwardly from a cylinder head of the engine body. The pressure regulator is supported, through a flexibly resilient case, by a support cage which is operatively attached to the body frame of the motorcycle.

The present invention according a second aspect thereof, in addition to the first aspect, is characterized in that the support cage is composed in a frame form by use of a lower frame body which is attached to the body frame so as to substantially cover a lower part of the pressure regulator unit, and to support the pressure regulator on the lower side thereof. The support cage according to the second aspect also includes an upper frame body which is fastened to the lower frame body, and the pressure regulator is clamped between the lower frame body and the upper frame body through the flexibly resilient case.

Incidentally, the brake lever 15 in the embodiment below corresponds to the brake operating element in the present invention, the front wheel pressure-generating unit 17F in the embodiment corresponds to the pressure-generating unit in the invention, the front pressure-regulating unit 18F in the embodiment corresponds to the pressure regulator in the invention, the first pressure sensor 34 in the embodiment corresponds to the operating force detector, lower and upper case members 80, 81 in the embodiment correspond to the flexibly resilient case, and the front brake caliper BF corresponds to the wheel brake.

EFFECTS OF THE INVENTION

According to the first aspect of the present invention, the pressure regulator is disposed in a location which is on the rear side of the intake system extended upwards from the cylinder head of the engine body and which is between the engine body and the fuel tank, arranged on the upper side of the engine body. Therefore, it can be ensured that the pressure regulator is not exposed to radiant heat from an exhaust system of the engine. Moreover, since the pressure regulator is flexibly supported through the flexibly resilient cases by the support cage supported on the body frame, transmission of vibrations from the engine to the pressure regulator can be suppressed.

In addition, according to the second aspect of the present invention, the pressure regulator can be flexibly supported by the support cage attached to the body frame, by a simple method in which the pressure regulator is supported through the flexibly resilient case on the lower frame body attached to the body frame, and further the upper frame body accompanied by the flexibly resilient case interposed between itself and the pressure regulator is attached to the lower frame body. Consequently, the mounting (assembling) operation is facilitated.

For a more complete understanding of the present invention, the following detailed description section should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention. Further, it should be noted that where a reference number is followed herein by multiple dots such as . . . , that is a short way of indicating that more than one of that referenced component is present in the assembled structure.

Now, a mode of carrying out the present invention will be described below, based on a selected illustrative embodiment of the invention shown in the attached drawings.

FIGS. 1 to 25 illustrate one embodiment of the present invention, in which various aspects of the depicted embodiment are shown, as summarized in the previous section.

Figure 1:
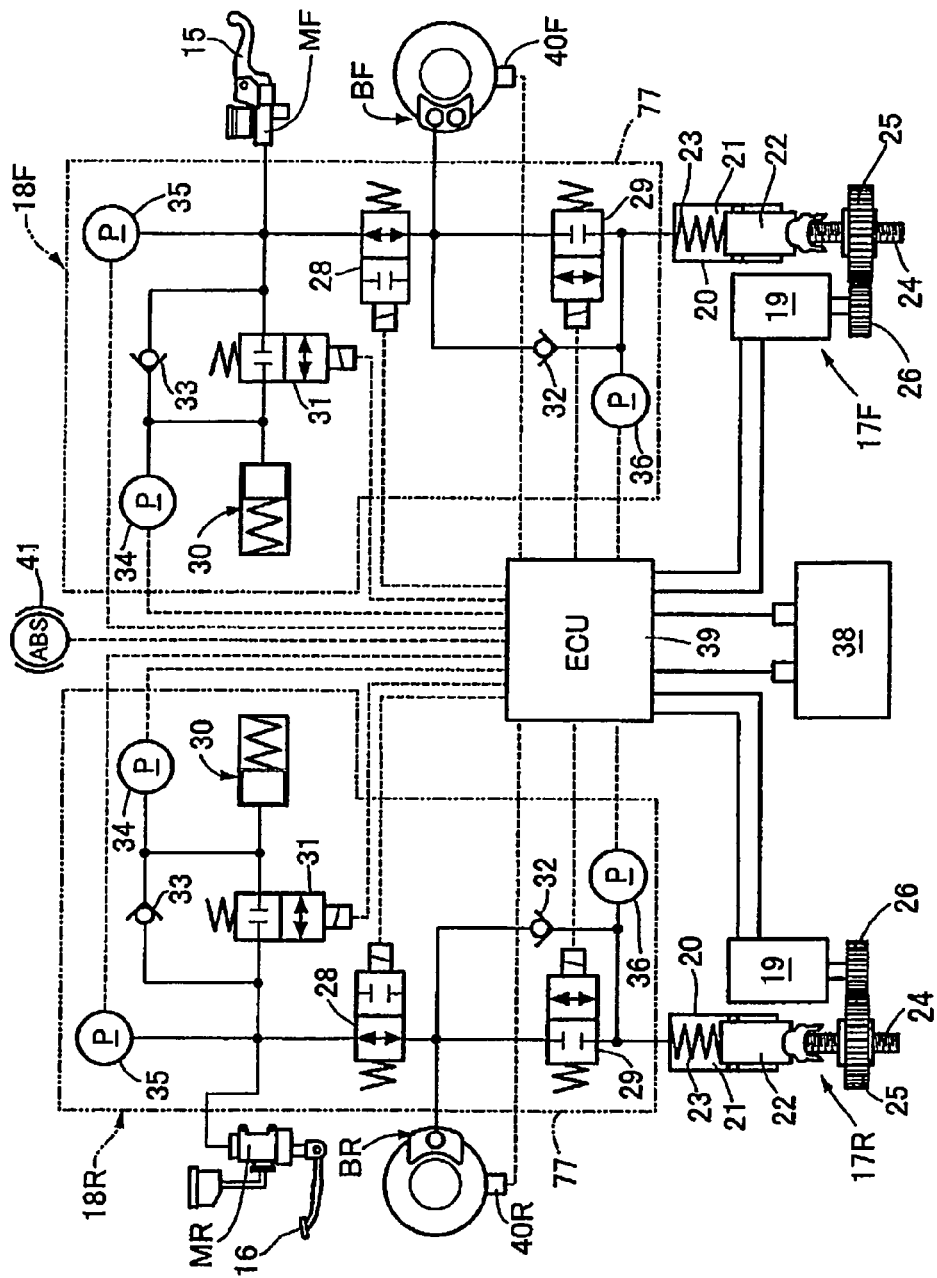
FIG. 1 is a diagram showing the configuration of a brake system for a motorcycle.

First, as shown on the right-hand side of FIG. 1, a front brake caliper BF provided in a motorcycle is provided with a front pressure-regulating unit 18F, by which a manual hydraulic pressure, outputted from a front master cylinder MF according to an operation of a brake lever 15 serving as a brake operating element, can be exerted, and also by which a separate automated hydraulic pressure, outputted from an automated front pressure-generating unit 17F, can also be exerted. The front pressure-regulating unit 18F is interposed between the front master cylinder MF and the automated front fluid pressure generator 17F, and regulates pressure applied to the front brake caliper BF.

In addition, as shown on the left-hand side of FIG. 1, the rear-wheel wheel brake BR is provided with a rear-wheel pressure regulator 18R by which a manually-applied hydraulic pressure, outputted from a rear-wheel master cylinder MR according to an operation of a brake pedal 16 serving as a brake operating element, can be exerted; and also by which a separate automated hydraulic pressure, outputted from an automated rear-wheel pressure-generating unit 17R, can also be exerted. The rear-wheel pressure regulator 18R is interposed between the rear-wheel master cylinder MR and the automated rear pressure generator 17R, and regulates pressure applied to the rear-wheel wheel brake BR.

The automated front fluid pressure generator 17F, which generates a hydraulic pressure by operation of an electric motor 19, includes: the electric motor 19, a piston 22 slidably fitted in a cylinder body 20 while forming a hydraulic pressure chamber 21 between itself and the cylinder body 20; a return spring 23 compressed between the cylinder body 20 and the piston 22 so as to urge the piston 22 to the side for increasing the internal volume of the hydraulic pressure chamber 21; a pushing shaft 24 coaxially linked to the piston 22 from the side opposite to the hydraulic pressure chamber 21; and a gear mechanism 26 which has a gear 25 coaxially screw engaged with the pushing shaft 24 through a ball screw (not shown) and which is connected to an output shaft of the electric motor 19. The automated front fluid pressure generator 17F can output a hydraulic pressure from the hydraulic pressure chamber 21, with the applied hydraulic pressure varying according to the operation of the electric motor 19.

The automated rear pressure generator 17R is configured in the same fashion as the automated front fluid pressure generator 17F above, and, therefore, it is only shown in the figure with its parts corresponding to those of the automated front fluid pressure generator 17F being denoted by the same reference symbols as used above, and with redundant detailed description thereof omitted.

The front pressure-regulating unit 18F includes a first solenoid valve 28, for controlling fluid communication between the front master cylinder MF and the front brake caliper BF; a second solenoid valve 29, for controlling fluid communication between the automated front fluid pressure generator 17F and the front brake caliper BF; and a stroke simulator 30 for exerting a dummy reaction force according to the operating force of the brake lever 15 on the front master cylinder MF when the first solenoid valve 28 is closed. The front pressure-regulating unit 18F also includes a third solenoid valve 31, for controlling fluid communication between the stroke simulator 30 and the front master cylinder MF; a first one-way check valve 32, connected in parallel to the second solenoid valve 29 so as to permit the flow of a brake fluid from the automated front fluid pressure generator 17F to the side of the front brake caliper BF; and a second one-way check valve 33 connected in parallel to the third solenoid valve 31 so as to permit the flow of the brake fluid from the stroke simulator 30 to the side of the front brake caliper BF.

The pressure in the stroke simulator 30 is detected by a first pressure sensor 34 serving as an operating force detector, the output hydraulic pressure of the front master cylinder MF is detected by a second pressure sensor 35, and hydraulic pressure output from the automated front fluid pressure generator 17F is detected by a third pressure sensor 36.

The first pressure sensor 34 obtains the operating force of the brake lever 15 by detecting the output hydraulic pressure of the front master cylinder MF when the first solenoid valve 28 is closed. The second pressure sensor 35 is provided for fail-safe diagnosis, and a judgment, that an abnormal state is present, can be made when a difference of not less than a predetermined value is generated between the pressure detected by the second pressure sensor 35 and the value detected by the first pressure sensor 34. In addition, the value detected by the third pressure sensor 36 is used in a hydraulic pressure feedback control for controlling hydraulic pressure output from the automated front fluid pressure generator 17F, on the basis of the value detected by the first pressure sensor 34.

The first solenoid valve 28 is a normally-open type solenoid valve, while the second and third solenoid valves 29, 31 are normally-closed type solenoid on-off valves. The opening and closing operations of the first to third solenoid valves 28, 29, 31, and the operations of the electric motor 19 in the automated front fluid pressure generator 17F, are controlled by a control unit (ECU) 39 connected with a battery 38. The control unit 39 is supplied with input signals corresponding to respective values detected by a front speed sensor 40F and the first to third pressure sensors 34, 35, 36. Based on the respective values detected by the front speed sensor 40F and the first to third pressure sensors 34 to 36, as well as on internal programming thereof, the control unit 39 controls the opening and closing operations of the first to third solenoid valves 28, 29, 31 and the operation of the electric motor 19. In addition, an alarm lamp 41 is connected to the control unit 39.

At the ignition-ON times of the motorcycle, the first solenoid valve 28 is in the open state, whereas the second and third solenoid valves 29, 31 are in the closed state, the electric motor 19 is in the non-operative state, and the alarm lamp 41 is in the ON state. When the brake lever 15 is operated to cause a hydraulic pressure to be outputted from the front master cylinder MF under this condition, the hydraulic pressure is exerted on the front brake caliper BF through the first solenoid valve 28.

When running of the motorcycle is started, the control unit 39 performs an initial diagnosis, and turns OFF the alarm lamp 41 if the system is judged to be in normal condition. After the start of the running of the motorcycle, the system is put into a stand-by state, the third solenoid valve 31 is opened, and the front master cylinder MF is put into fluid communication with the stroke simulator 30.

In response to the detection by the first pressure sensor 34 of a hydraulic pressure of not less than a predetermined value due to an operation of the brake lever 15 during the stand-by condition, the control unit 39 closes the first solenoid valve 28 and opens the second solenoid valve 29, by energizing these valves. Further, the control unit 39 operates the electric motor 19 of the automated front fluid pressure generator 17F, to control hydraulic pressure output from the automated front fluid pressure generator 17F (which is detected by the third pressure sensor 36), in such a manner that hydraulic pressure output from the automated front fluid pressure generator 17F will be brought to a pressure corresponding to the value detected by the first pressure sensor 34. This ensures that the front brake caliper BF is supplied with hydraulic pressure outputted from the automated front fluid pressure generator 17F according to the operational load on the brake lever 15.

The rear-wheel pressure regulator 18R is configured in the same fashion as the front pressure-regulating unit 18F above, and, therefore, it is only shown in the figure with its parts corresponding to those of the front pressure-regulating unit 18F being denoted by the same reference symbols as used above, and with redundant detailed description thereof omitted. Incidentally, in the hydraulic pressure control by the rear-wheel pressure regulator 18R, the control unit 39 uses the value detected by the rear-wheel speed sensor 40R in place of the value detected by the front speed sensor 40F, which is used in the hydraulic pressure control by the front pressure-regulating unit 18F.

In addition, by performing the hydraulic pressure control by the rear-wheel pressure regulator 18R together with the hydraulic pressure control by the front pressure-regulating unit 18F according to the operation of the brake lever 15, the control unit 39 can carry out a rear-wheel braking force distribution control by which the front and rear-wheel wheel brakes BF, BR are operated so as to exert distributed braking forces on the front wheel and the rear wheel. Besides, on the contrary, by performing the hydraulic pressure control by the front pressure-regulating unit 18F together with the hydraulic pressure control by the rear-wheel pressure regulator 18R in response to the operation of the brake pedal 16, the control unit 39 can carry out a rear-wheel braking force distribution control by which the front and rear-wheel wheel brakes BF, BR are operated so as to apply distributed braking forces to the front wheel and the rear wheel.

Figure 2:
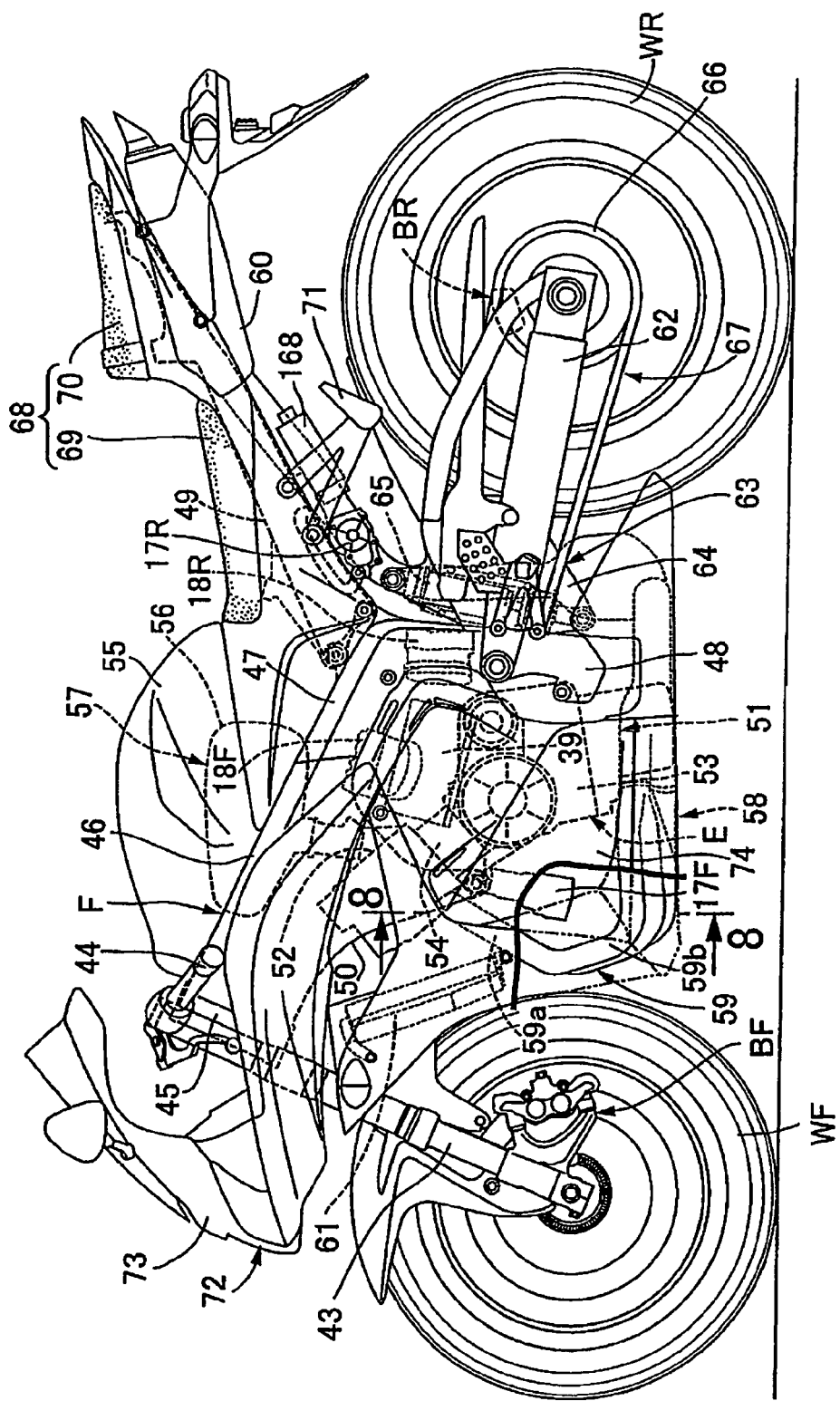
FIG. 2 is a left side view of the motorcycle.
Figure 3:
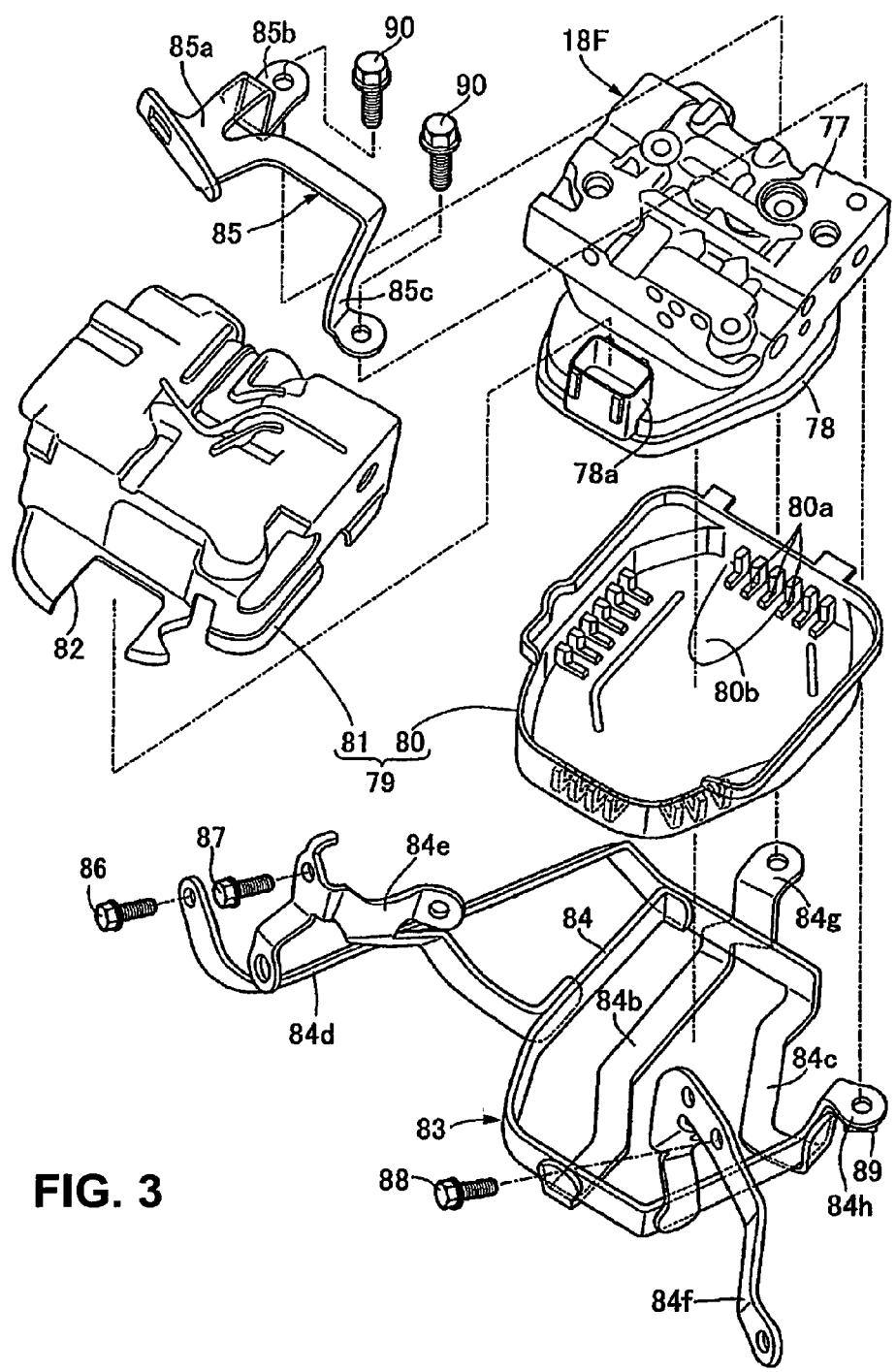
FIG. 3 is an exploded perspective view of a support structure for a front pressure unit.
Figure 4:
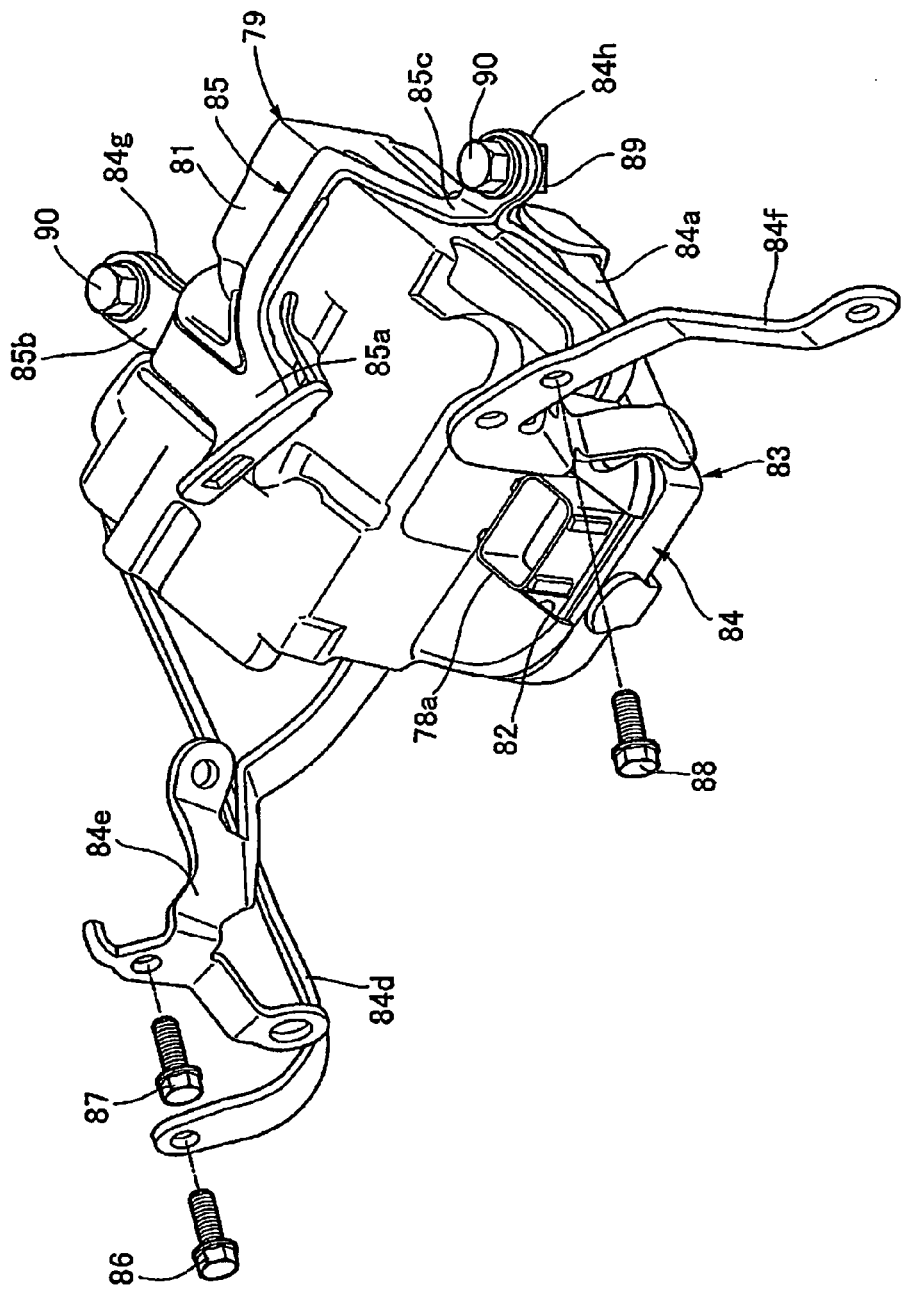
FIG. 4 is a perspective view showing the condition where the front pressure regulator is supported by a support cage.
Figure 5:
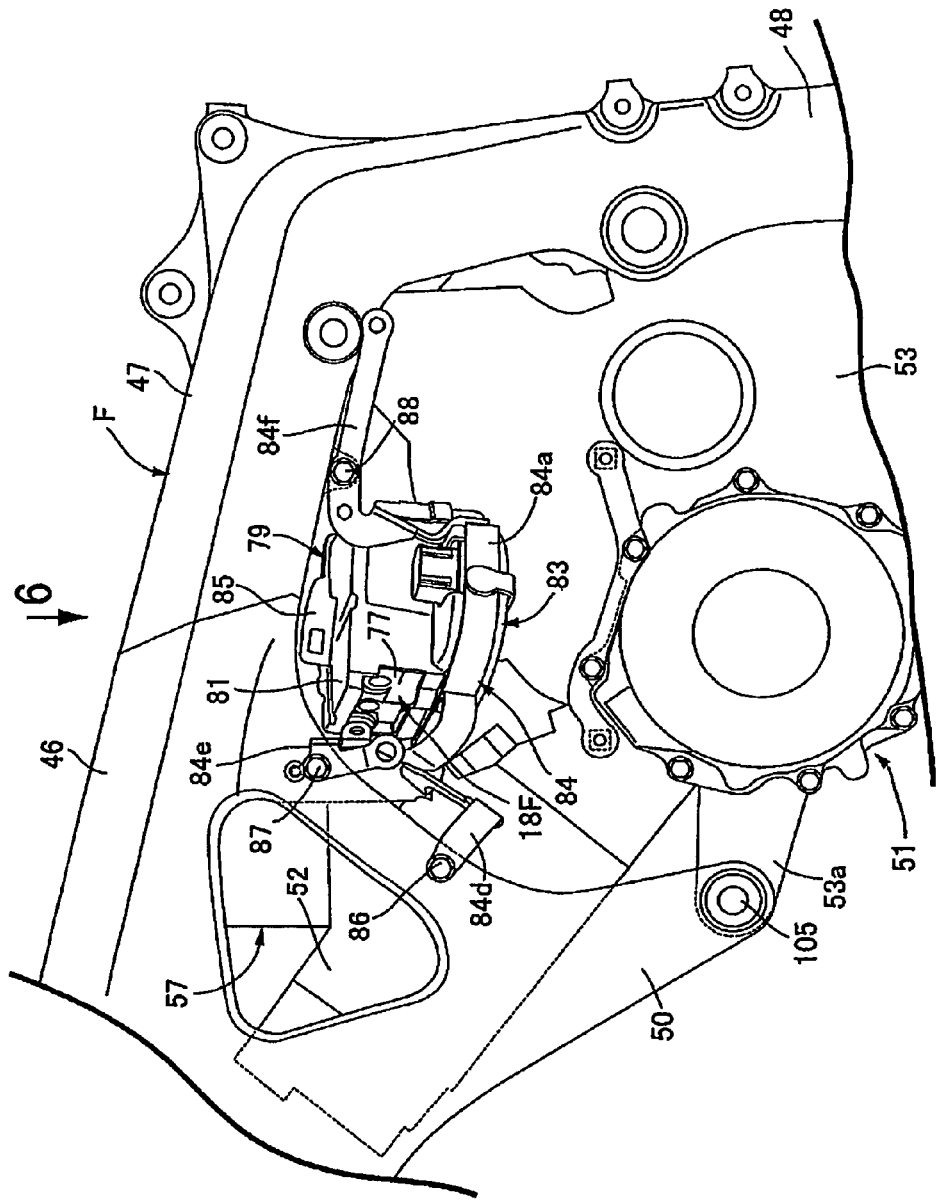
FIG. 5 is a side view showing the condition where the front pressure regulator is supported on a body frame.
Figure 6:
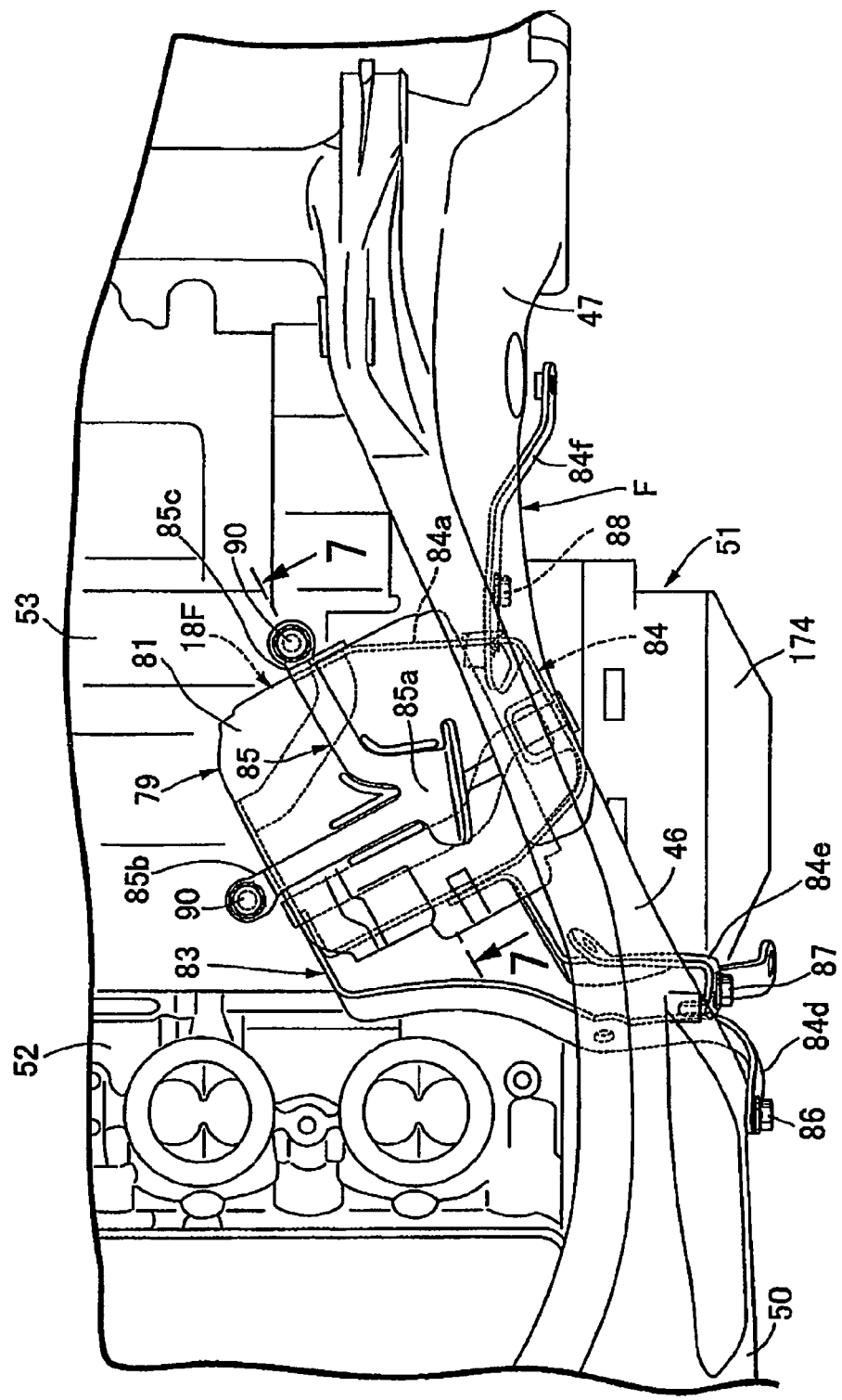
FIG. 6 is a plan view taken along arrow 6 of FIG. 5.
Figure 7:
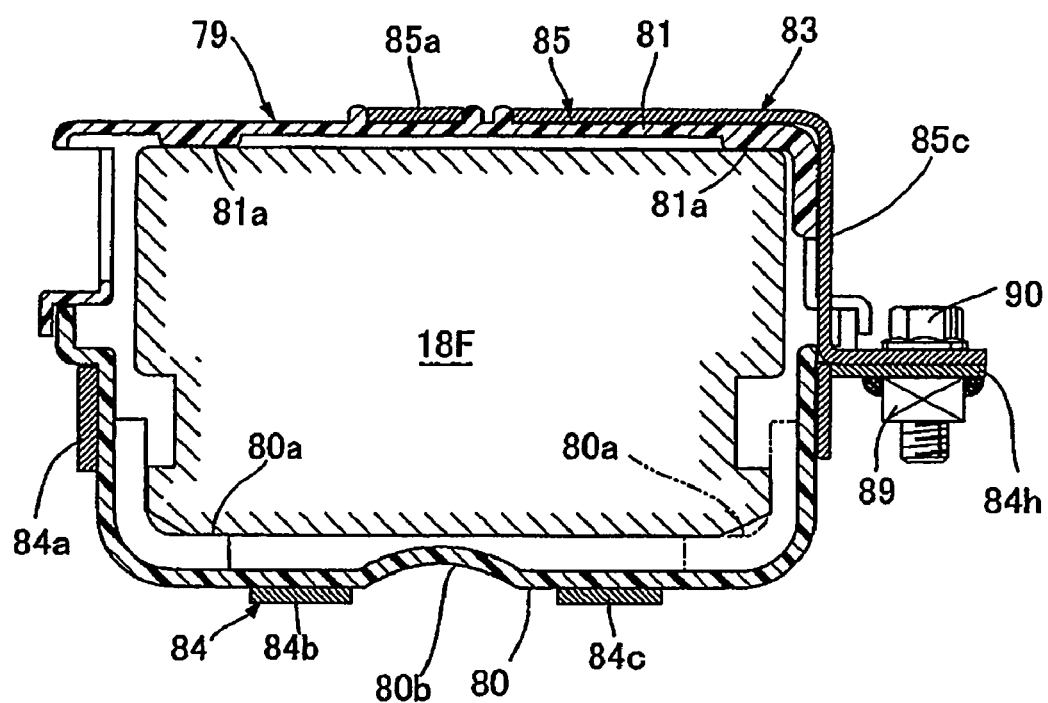
FIG. 7 is a sectional view taken along line 7-7 of FIG. 6.

In FIG. 2, the body frame F of the motorcycle includes: a head pipe 45 on which a front fork 43 rotatably bearing the front wheel WF equipped with the front brake caliper BF and a steering handlebar 44 connected to the front fork 43 are pivotally borne; a left-right pair of main frames 46 . . . extending rearwardly downwards from the head pipe 45; center frames 47 . . . connected respectively to rear parts of both the main frames 46 . . . ; pivot plates 48 . . . integrally connected to the center frames 47 . . . and extending downwards; and a left-right pair of seat rails 49 . . . connected to rear parts of the center frames 47 . . . and extending rearwardly upwards.

The main frames 46 . . . are integrally provided with engine hangers 50 . . . extending downwards. An engine body 51 of an engine E, which may be of the in-line four-cylinder type, for example, is supported by lower parts of the engine hangers 50 . . . , the center frames 47 . . . and the pivot plates 48 . . . , in such an attitude that the cylinder axis thereof is inclined forwardly upwards.

The engine body 51 includes: a crankcase 53; a cylinder block 54 rising at a forwardly upward inclination from the crankcase 53; and a cylinder head 52 connected to an upper part of the cylinder block 54.

A fuel tank 55 is mounted on both the main frames 46 . . . on the upper side of the engine body 51. In addition, an upwardly extending intake system 57 is connected to a rear surface of the cylinder head 52 of the engine body 51, and an air cleaner 56 that the intake system 57 has at its upstream end is so disposed as to be covered with the fuel tank 55. On the other hand, an exhaust system 58 connected to a front surface of the cylinder head 52 includes: a plurality of exhaust pipes 59 . . . which are connected to the front surface of the cylinder head 52 in the manner of corresponding respectively to the cylinders and which extend downwards from the cylinder head 52; and an exhaust muffler 60 disposed between rear parts of both the seat rails 49 . . . in the state of being connected to the exhaust pipes 59 . . . . Moreover, the exhaust pipes 59 . . . have inclined parts 59a extending forwardly downwards from the front surface of the cylinder head 52, and curved parts 59b curved from lower parts of the inclined parts 59a . . . toward the lower side of the engine body 51, so that a space triangular in shape in side view is formed between the exhaust pipes 59 and the front surface of the engine body 51. Furthermore, on the front side of the engine body 51, a radiator 61 is fixedly disposed so as to be located on the skew upper side of the exhaust pipes 59 . . . .

On the pivot plates 48 . . . of the body frame F, a front end part of a swing arm 62 rotatably supporting the rear wheel WR (which is equipped with the rear-wheel wheel brake BR) on its rear end parts is vertically swingably borne. A link mechanism 63 is provided between a front-end-side lower part of the swing arm 62 and lower parts of the pivot plates 48, and a lower end part of a shock absorber 65 connected at its upper end part to the swing arm 62 and extending vertically is connected to a link member 64 constituting a part of the link mechanism 63.

Besides, an output from a transmission (not shown) incorporated in the crankcase 53 possessed by the engine body 51 is transmitted to the rear wheel WR through a chain-type power transmission 67 having an endless chain 66.

A riders' seat 68 is provided on the seat rails 49 . . . so as to be disposed on the rear side of the fuel tank 55. The riders' seat 68 includes a front seat 69 on which to seat the driver, and a rear seat 70 on which to seat the passenger and which is spaced to the rear side from the front seat 69. Pillion steps 71 on which to rest the feet of the passenger seated on the rear seat 70 are fastened to outside surfaces of intermediate parts of the seat rails 49 . . . .

A part of the body frame F and the engine E are covered with a front cowl 72 formed from a synthetic resin. The front cowl 72 includes a front cover part 73 for covering the head pipe 45 on the front side, and side covers 74 . . . which are in connection with the front cover 73 and which cover the engine body 51, the exhaust pipes 59 . . . of the exhaust system 58, and the radiator 61 on both lateral sides.

In the motorcycle as above, the automated front fluid pressure generator 17F, the front pressure-regulating unit 18F, the automated rear pressure generator 17R, the rear-wheel pressure regulator 18R and the control unit 39 are disposed in the vicinity of the engine E, i.e., in the vicinity of the center of the vehicle body.

Now, a structure for arrangement of the automated front fluid pressure generator 17F, the front pressure-regulating unit 18F, the automated rear pressure generator 17R, the rear-wheel pressure regulator 18R, and the control unit 39 in the motorcycle, and the operations and effects of the structure, will be sequentially described below.

Front Pressure-Regulating Unit 18F

An arrangement structure of the front pressure-regulating unit 18F will now be described, referring to FIGS. 3 to 7. First, in FIG. 3, the component parts of the of the front pressure-regulating unit 18F, including the first solenoid valve 28, the second solenoid valve 29, the stroke simulator 30, the third solenoid valve 31, the first one-way check valve 32, and the second one-way check valve 33 are arranged in or on a support block 77. The first to third pressure sensors 34 to 36 are also arranged on the support block 77.

The support block 77 is formed substantially in a rectangular parallelepiped (box-like) shape by a casting of light metal, such as an aluminum alloy. Outwardly-projecting parts of the first solenoid valve 28, the second solenoid valve 29, the third solenoid valve 31, the first one-way check valve 32 and the second one-way check valve 33, where such parts project from the support block 77, are covered by a synthetic plastic resin cover member 78, integrally provided with a terminal connector 78a thereon. Outwardly-projecting parts of the first to third pressure sensors 34 to 36 are also similarly covered with the cover member 78.

Referring to FIGS. 4 to 7 also, the front pressure-regulating unit 18F is arranged in a position which is on the rear side of the intake system 57, which is connected to the cylinder head 52 of the engine body 51 mounted on the body frame F and extended upwards from the cylinder head 52. The intake system 57 is between the engine body 51 and the fuel tank 55, which is disposed above the engine body 51. The front pressure-regulating unit 18F is flexibly supported, through a flexibly resilient case 79 covering the pressure-regulating unit 18F, on support cage 83 supported on the body frame F.

The flexibly resilient case 79 includes lower and upper case members 80, 81 provided as bisected lower and upper parts so as to clamp the front pressure-regulating unit 18F in such an attitude as to have the support block 77 located on the upper side. Both the case members 80, 81 are formed of a flexibly resilient material, for example, a rubber, flexible plastic or elastomer.

The lower case member 80 is formed in a box-like shape open to the upper side so that the cover 78 of the front pressure-regulating unit 18F can be fitted therein, and the upper case member 81 is formed in a box-like shape open to the lower side so that the support block 77 of the front pressure-regulating unit 18F can be fitted therein. Moreover, the upper case member 81 is provided with a cutout 82 formed therein, for permitting the terminal connector 78a of the cover 78 to project therethrough. In addition, of both the case members 80 and 81, at least the lower case member 80 is integrally and projectingly provided at its inner surface, in this embodiment, both the case members 80 and 81 are integrally and projectingly provided at their inner surface, with a plurality of substantially L-shaped corner projections 80a . . . , 81a . . . put into the pressure-regulating unit 18F.

The support cage 83 is composed in a frame form by use of a lower cage body 84 which is attached to the body frame F so as to cover substantially the whole perimeter of a lower part of the front pressure-regulating unit 18F and to support the front pressure-regulating unit 18F on the lower side of the latter, and an upper cage body 85 which is fastened to the lower cage body 84.

The lower cage body 84 has a plurality of bent, small-width metallic plate materials connected to each other. Specifically, the lower cage body 84 includes: a first cage part 84a substantially surrounding a side portion of the lower part 78 of the front pressure-regulating unit 18F; two lower support bars 84b, 84c connected to the first cage part 84a so as to support the front pressure-regulating unit 18F on the lower side thereof; three support arm parts 84d, 84e, 84f extending outwardly sideways from the first cage part 84a; and two attaching projected parts 84g, 84h projected from the first cage part 84a, for being fastened to the upper cage body 85. The front pressure-regulating unit 18F, together with the lower case member 80 fitted in a lower part thereof, is fitted into and supported by the first cage part 84a and both the lower support bars 84b, 84c of the lower cage body 84.

The support arm parts 84d, 84e, 84f are extended to the side of the left-side main frame 46 and the left-side center frame 47, of both the main frames 46 . . . and both the center frames 47 . . . of the body frame F. The support arm part 84d is fastened to the engine hanger 50 integral with the main frame 46 by a bolt 86, the support arm part 84e is fastened to the main frame 46 on the rear side relative to the engine hanger 50 by a bolt 87, and the support arm part 84f is fastened to the center frame 47 by a bolt 88.

The upper cage body 85 is brought from above into contact with the upper case member 81 fitted from above into an upper part, or the support block 77, of the front pressure-regulating unit 18F, and is fastened to both the attaching projected parts 84g, 84h of the lower cage body 84. The upper cage body 85 integrally includes: an upper bar 85a put into contact with the upper case member 81 from above; and a pair of attaching leg parts 85b, 85c extended from the upper bar 85a toward the sides of both the attaching projected parts 84g, 84h.

On the other hand, weld nuts 89 . . . are firmly attached to the lower surfaces of both the attaching projected parts 84g, 84h of the lower cage body 84. Bolts 90, 90 passed through tip parts of both the attaching leg parts 85b, 85c and through both the attaching projected parts 84g, 84h are screw engaged with the weld nuts 89 . . . and tightened, whereby the upper frame body 85 is fastened to the lower cage body 84. As a result, the support cage 83 is composed in a frame form by use of the lower cage body 84 which is attached to the body frame F so as to cover substantially the whole perimeter of the lower part of the front pressure-regulating unit 18F and to support the front pressure-regulating unit 18F on the lower side of the latter, and the upper frame body 85 fastened to the lower cage body 84. Besides, the front pressure-regulating unit 18F is clamped between the lower cage body 84 and the upper frame body 85, with the lower case member 80 and the upper case member 81 (which are formed of a flexible plastic material) interposed therebetween.

Moreover, the front pressure-regulating unit 18F is disposed on the upper side of and in proximity to a cooling pipe (not shown) constituting a part of a cooling water circulation circuit provided for the engine E. In view of this, the lower case member 80 is provided in its lower surface with a recessed part 80b which is curved to the upper side in order to obviate interference with the cooling water pipe, whereby a cooling effect on the front pressure-regulating unit 18F owing to the arrangement of the unit in proximity to the cooling water pipe can be obtained.

According to the arrangement structure of the front pressure-regulating unit 18F as above, the front pressure-regulating unit 18F is covered by the flexibly resilient case 79, so that the influence of the heat from the engine E can be prevented from being exerted on the front pressure-regulating unit 18F. In addition, since the front pressure-regulating unit 18F is flexibly supported through the flexibly resilient case 79 on the support cage 83 supported on the body frame F, transmission of vibrations from the engine E to the front pressure-regulating unit 18F can be suppressed.

Moreover, the front pressure-regulating unit 18F is arranged in a position which is on the rear side of the intake system 57 being connected to the cylinder head 52 of the engine body 51 mounted on the body frame F and being extended upwards from the cylinder head 52 and which is between the engine body 51 and the fuel tank 55 disposed on the upper side of the engine body 51.

This ensures that the front pressure-regulating unit 18F is disposed at such a position as to be less liable to be exposed to the radiant heat from the exhaust system 58 of the engine E, whereby the influence of the heat from the engine E upon the front pressure-regulating unit 18F can be effectively restrained. In addition, the front pressure-regulating unit 18F is laid out in a comparatively large vacant space on the rear side of the intake system 57, whereby the influence of the front pressure-regulating unit 18F upon the layout of other component parts can be minimized.

Besides, the flexibly resilient case 79 is composed of the flexibly resilient lower and upper case members 80, 81 provided as bisected lower and upper parts so as to clamp the front pressure-regulating unit 18F from the lower and upper sides, and, at least the lower case member 80 of both the case members 80 and 81, in this embodiment, both of the case members 80 and 81 are integrally and projectingly provided at their inner surfaces with the plurality of projected parts 80a . . . , 81a . . . put into contact with the front pressure-regulating unit 18F. Therefore, the front pressure-regulating unit 18F can be flexibly supported assuredly while facilitating the operation of containing the front pressure-regulating unit 18F into the flexibly resilient case 79.

Furthermore, the front pressure-regulating unit 18F is flexibly supported, through the lower and upper case members 80 and 81 of the flexibly resilient case 79, on the support cage 83 mounted to the body frame F. Besides, the support cage 83 is composed in a frame form by use of the lower cage body 84 which is attached to the body frame F so as to cover substantially the whole perimeter of the lower part of the front pressure-regulating unit 18F and to support the front pressure-regulating unit 18F on the lower side of the latter, and the upper frame body 85 which is fastened to the lower cage body 84. Moreover, the front pressure-regulating unit 18F is clamped between the lower cage body 84 and the upper frame body 85, with the lower and upper case members 80 and 81 therebetween.

Therefore, by a simple process in which the front pressure-regulating unit 18F is mounted to the lower cage body 84 attached to the body frame F through the lower case member 80 and then the upper frame body 85 with the upper case member 81 interposed between itself and the front pressure-regulating unit 18F is attached to the lower cage body 84, the front pressure-regulating unit 18F can be flexibly supported on the support cage 83 mounted to the body frame F. Thus, the mounting operation is facilitated.

Automated Front Pressure-Generating Unit

An arrangement structure of the automated front fluid pressure generator 17F will be described referring to FIGS. 8 to 13. First, as shown in FIG. 2, the automated front fluid pressure generator 17F is arranged between the engine body 51 and the exhaust pipes 59 . . . extended downwards from the front surface of the cylinder head 52 in the engine body 51. Moreover, the exhaust pipes 59 . . . include the inclined parts 59a . . . which extends forwardly downwards from the front surface of the cylinder head 52, and the curved parts 59b . . . which are curved from the lower parts of the inclined parts 59a . . . toward the lower side of the engine body 51, in such a manner that a space rectangular in shape in side view is formed between themselves and the front surface of the engine body 51, with the automated front fluid pressure generator 17F being arranged in the space. Furthermore, the automated front fluid pressure generator 17F is arranged on the rear lower side of the radiator 61 which is supported on the body frame F on the front side of the engine body 51.

Figure 8:
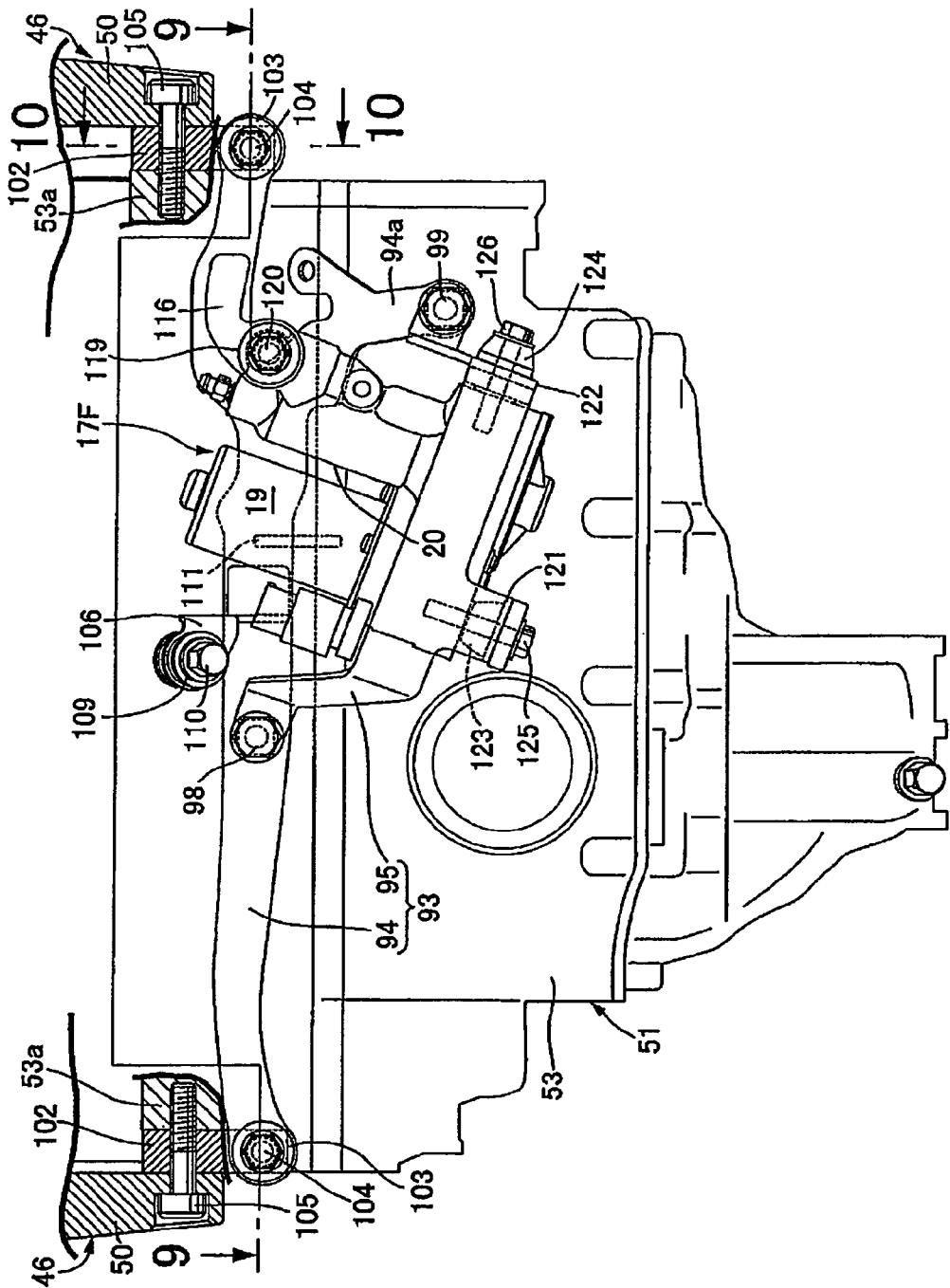
FIG. 8 is a partly cut-away front view, as viewed along line 8-8 of FIG. 2, of the body frame, an engine body and front pressure-generating unit.

In FIG. 8, the automated front fluid pressure generator 17F is supported, through a support bracket 93, on the engine hangers 50 . . . provided to be integral with the left-right pair of main frames 46 which extend rearwardly downwards from the head pipe 45 and which constitute a part of the body frame F. The support bracket 93 is composed in a frame form by use of a first support frame section 94 which is attached to the engine hangers 50 . . . and which extends in the left-right direction on the rear side of the automated front fluid pressure generator 17F, and a second support frame section 95, which is attached to the first support frame section 94 in such a manner as to surround the automated front fluid pressure generator 17F from the front side of the latter.

Figure 9:
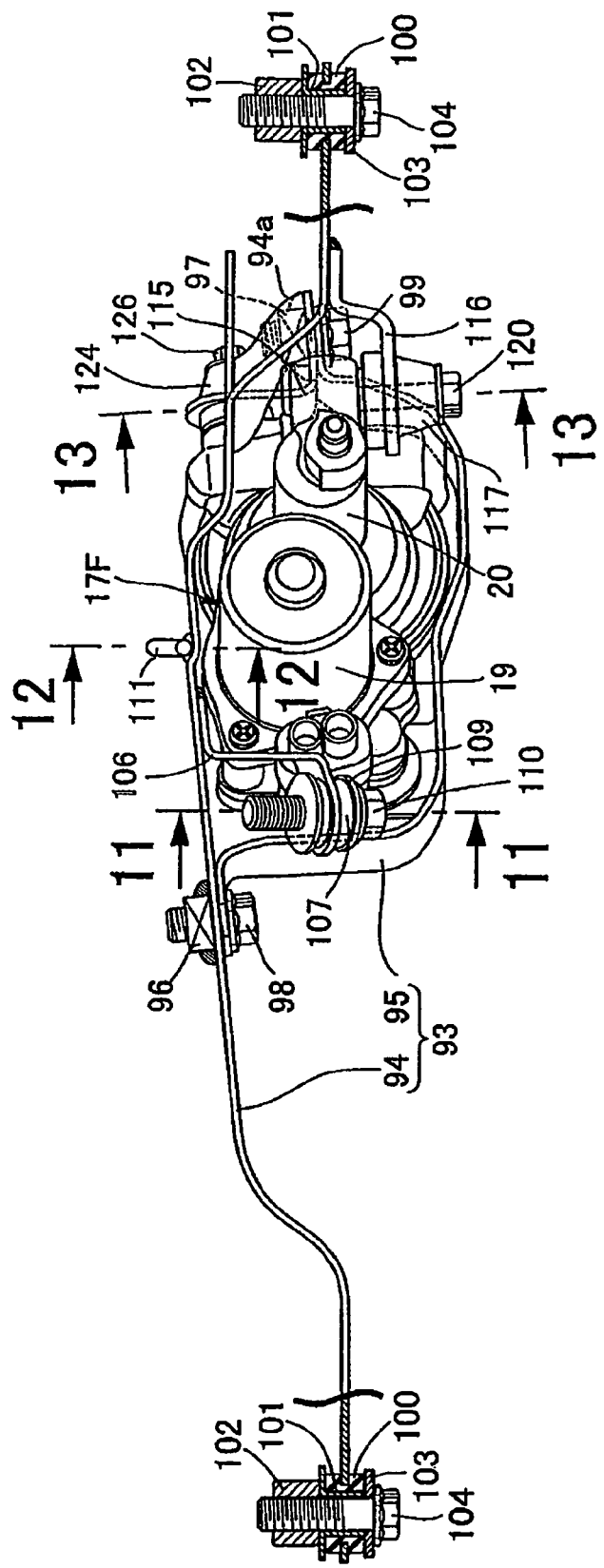
FIG. 9 is a sectional view taken along line 9-9 of FIG. 8.

Referring to FIG. 9 also, a weld nut 96 is securely attached to the rear surface of an intermediate part in the width direction of the first support frame section 94, and a weld nut 97 is secured to the rear surface of a tip part of a support arm part 94a branched angularly downward from a left-side end part (in FIG. 8, a right-side end part) of the first support frame section 94 as viewed from a person facing in the running (forward) direction of the motorcycle. One end part of the second support frame section 95 is fastened to the intermediate part in the width direction of the first support frame section 94 by a bolt 98 screw engaged with the weld nut 96, and the other end part of the second support frame section 95 is firmly attached to the tip part of the support arm part 94a of the first support frame section 94 by a bolt 99 screw engaged with the weld nut 97.

Figure 10:
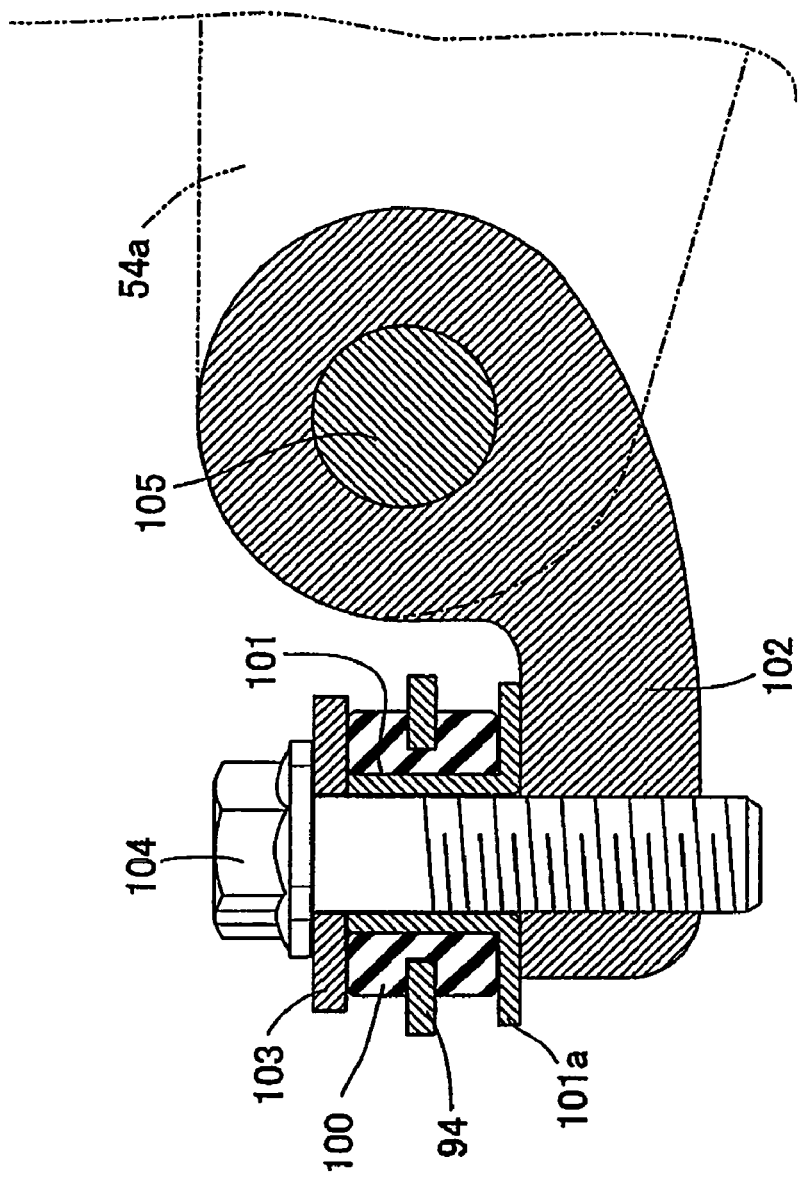
FIG. 10 is a sectional view taken along line 10-10 of FIG. 8.

Referring to FIG. 10 also, while the brackets 53a... provided at the crankcase 53 of the engine body 51 are fastened to the engine hangers 50... provided to be integral with the main frames 46... through bolts 105, attaching members 102... clamped between the brackets 53a... and the engine hangers 50... are co-fastened to the engine hangers 50... together with the brackets 53a... by the bolts 105.

On the other hand, both end parts of the first support frame section 94 are fitted with rubber bushings 100, 100. Collars 101... provided at their one-side ends with flange parts 101a... projecting outwards are inserted in the rubber bushings 100... and the flange parts 101a... are put in abutment on the attaching members 102.... In addition, washers 103... are put in contact with the other-side ends of the collars 101... so that the collars 101... are clamped between the washers 103... and the attaching members 102..., and bolts 104... passed through the washer 103... and the collars 101... are screw engaged with the attaching members 102.... Thus, both left and right end parts of the first support frame section 94 of the support bracket 93 are fastened to the engine hangers 50... of the left-right pair of main frames 46..., by co-fastening thereof together with the brackets 53a... of the crankcase 53 in the engine body 51.

Figure 11:
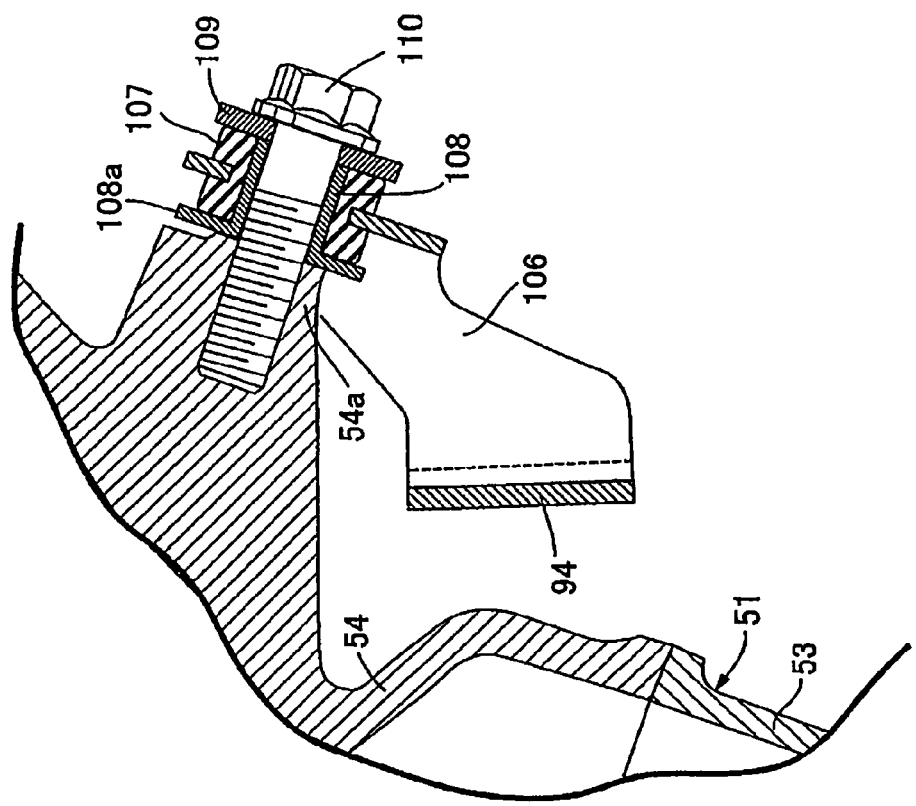
FIG. 11 is a sectional view taken along line 11-11 of FIG. 9.

Referring to FIG. 11 also, an attaching arm 106 extending upwards is securely attached to an intermediate part in the left-right direction of the first support frame section 94. A rubber bushing 107 is mounted to an upper end part of the attaching arm 106, and a collar 108 provided at its one end with a flange part 108a projecting outwards is passed through the rubber bushing 107. On the other hand, the cylinder block 54 of the engine body 51 is provided with a support boss part 54a for contact with the flange part 108a. A washer 109 is put in contact with the other end of the collar 108 so as to clamp the collar 108 between itself and the support boss part 54a, and a bolt 110 passed through the washer 109 and the collar 108 is screw engaged with the support boss part 54a.

Figure 12:
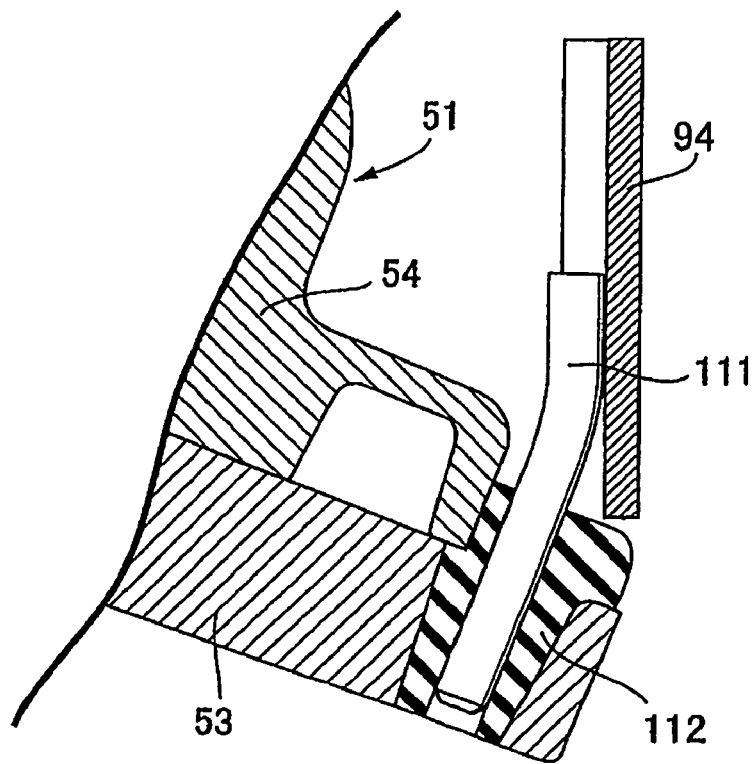
FIG. 12 is an enlarged sectional view taken along line 12-12 of FIG. 9.

Referring to FIG. 12 also, a support bar 111 extending downwards is secured to an intermediate part in the left-right direction of the first support frame section 94. The support bar 111 is fitted in a rubber bushing 112 mounted to the crankcase 53 of the engine body 51.

Thus, both the left and right end parts of the first support frame section 94 of the support bracket 93 are supported on the engine hangers 50... of the main frames 46... through the rubber bushings 100..., and the intermediate part in the left-right direction of the first support frame section 94 is supported on the engine body 51 through the rubber bushings 107, 112.

The automated front fluid pressure generator 17F is elastically supported by the support member 93, and a support plate 116 opposed from the front side to a bracket 115 provided at a left side part of the automated front fluid pressure generator 17F is firmly attached to the first support frame section 94 of the support bracket 93.

Figure 13:
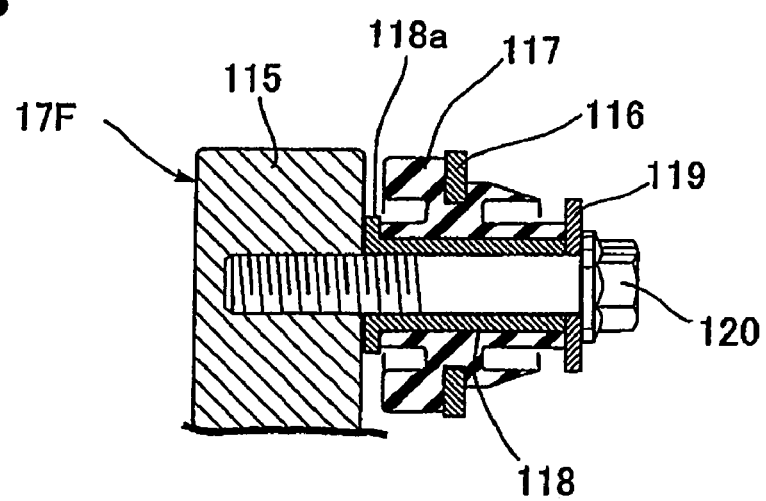
FIG. 13 is an enlarged sectional view taken along line 13-13 of FIG. 9.

In FIG. 13, a rubber bushing 117 is mounted to the support plate 116, and a collar 118 provided at its one end with a flange part 118a projecting outwards is passed through the rubber bushing 117 so that the flange part 118a makes contact with the bracket 115. In addition, a washer 119 is put in contact with the other end of the collar 118 so as to clamp the collar 118 between itself and the bracket 115, and a bolt 120 passed through the washer 119 and the collar 118 is screw engaged with the bracket 115.

Besides, the second support frame section 95 is provided with a support plate part 121 which is opposed to the automated front fluid pressure generator 17F from the lower side, and a support plate 122 which is opposed to the automated front fluid pressure generator 17F from the left side. Rubber bushings 123, 124 mounted to the lower support bars 121, 122 are attached to the automated front fluid pressure generator 17F through bolts 125, 126 by use of the same structure as that shown in FIG. 13.

In short, the automated front fluid pressure generator 17F is supported on the support bracket 93 through the rubber bushings 117, 123, and 124.

According to the arrangement structure of the automated front fluid pressure generator 17F as above, the automated front fluid pressure generator 17F is arranged between the engine body 51 and the exhaust pipes 59... extended downwards from the cylinder head 52. Therefore, the automated front fluid pressure generator 17F can be laid out by utilizing effectively the vacant space which is on the front side of the engine body 51 and on the lower side of the exhaust pipes 59..., whereby concentration of mass can be contrived. Moreover, although the heat from the exhaust pipes 59... reaches the automated front fluid pressure generator 17F, the running airflow generated by the running of the motorcycle comes into contact with the automated front fluid pressure generator 17F, so that the temperature of the automated front fluid pressure generator 17F can be prevented from rising excessively. In addition, since the support bracket 93 for supporting the automated front fluid pressure generator 17F is supported through the rubber bushings 100..., 107, 112 on the engine body 51 and the engine hangers 50... of the main frames 46... constituting a part of the body frame F, transmission of vibrations from the engine E to the automated front fluid pressure generator 17F can also be restrained.

In addition, the cylinder head 52 is connected to an upper part of the cylinder block 54 rising at a forwardly upward inclination from the crankcase 53. The exhaust pipes 59... connected to the front surface of the cylinder head 52 have the inclined surfaces 59a... extending forwardly downwards from the front surface of the cylinder head 52, and the curved parts 59b... curved from the lower parts of the inclined parts 59a... toward the lower side of the engine body 51, and a space triangular in shape in side view is formed between the exhaust pipes 59... and the front surface of the engine body 51. Moreover, the automated front fluid pressure generator 17F is laid out in the space. Therefore, since a comparatively large space can be secured between the exhaust pipes 59... and the front surface of the engine body 51, the running airflow can easily flow in the surroundings of the automated front fluid pressure generator 17F disposed in the space, and the temperature of the automated front fluid pressure generator 17F can be effectively prevented from rising excessively.

Besides, both the left and right end parts of the first support frame section 94 in the support bracket 93 are supported on the engine hangers 50... of the left-right pair of main frames 46 ... through the rubber bushings 100 ..., and the intermediate part in the left-right direction of the first support frame section 94 is supported on the engine body 51 through the rubber bushings 107, 112, so that the automated front fluid pressure generator 17F can be flexibly supported while enhancing the rigidity of the support bracket 93.

In addition, since both the left and right end parts of the support bracket 93 are fastened to the engine hangers 50 ... of the main frames 46 ... by co-fastening thereof together with the brackets 53a ... of the crankcase 53 of the engine body 51, a reduction in the number of component parts and a reduction in the number of working steps can be contrived.

Besides, the support bracket 93 is composed in a frame form by use of the first support frame section 94 which is attached to the engine hangers 50 ... of the main frames 46 ... and which extends in the left-right direction on the rear side of the automated front fluid pressure generator 17F, and the second support frame section 95 which is attached to the first support frame section 94 in such a manner as to surround the automated front fluid pressure generator 17F from the front side. Therefore, the automated front fluid pressure generator 17F can be supported in such a manner that the automated front fluid pressure generator 17F can easily receive the running airflow.

Furthermore, since the automated front fluid pressure generator 17F is laid out on the rear lower side of the radiator 61 supported by the body frame F on the front side of the engine body 51, the automated front fluid pressure generator 17F can be protected by the radiator 61 and the exhaust pipes 59 ... from foreign matters such as flying stones coming from the front side.

Rear-Wheel Pressure Regulator 18R

Figure 14:
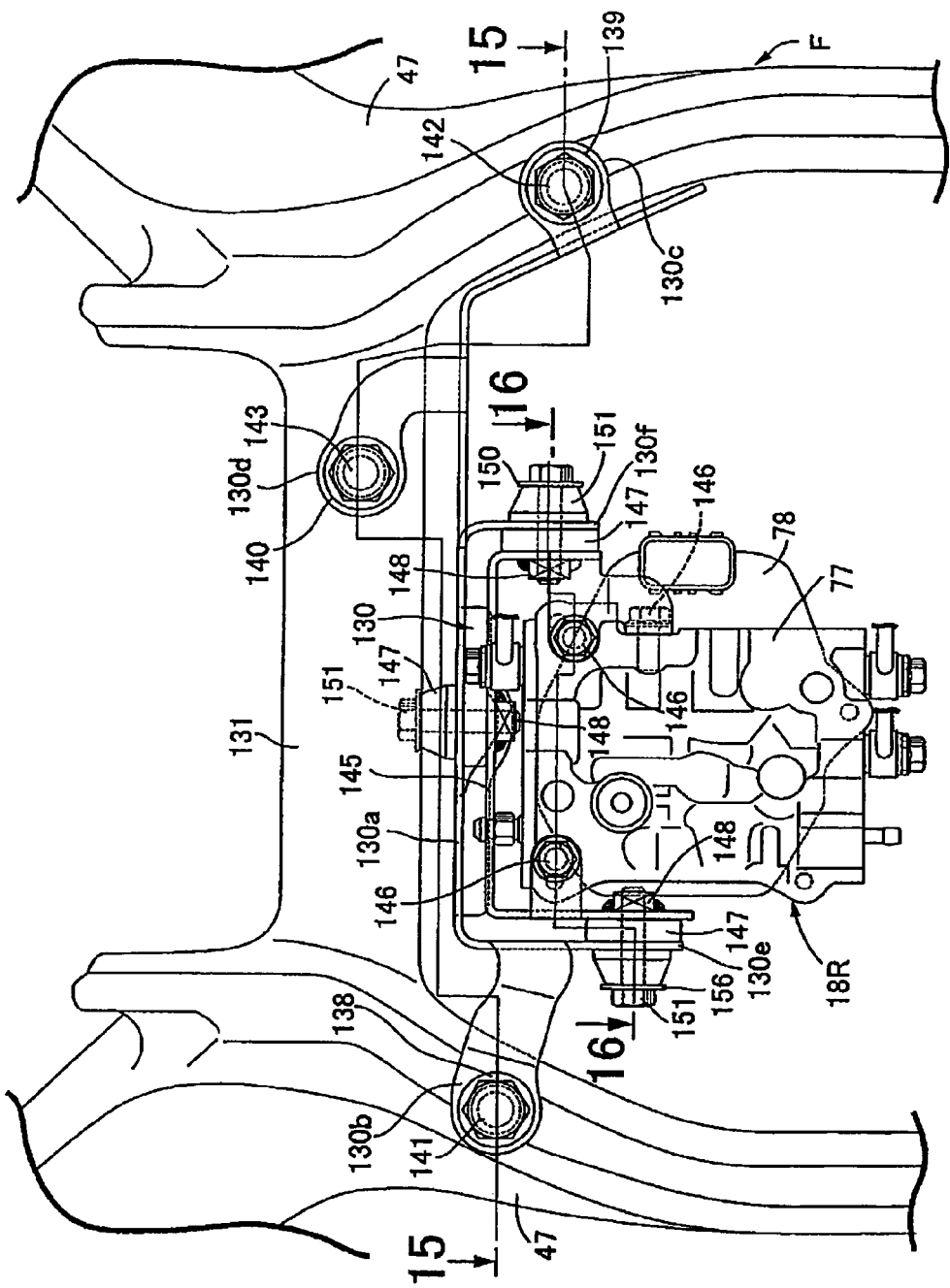
FIG. 14 is a view from the rear side of a rear-wheel pressure regulator and the body frame.
Figure 15:
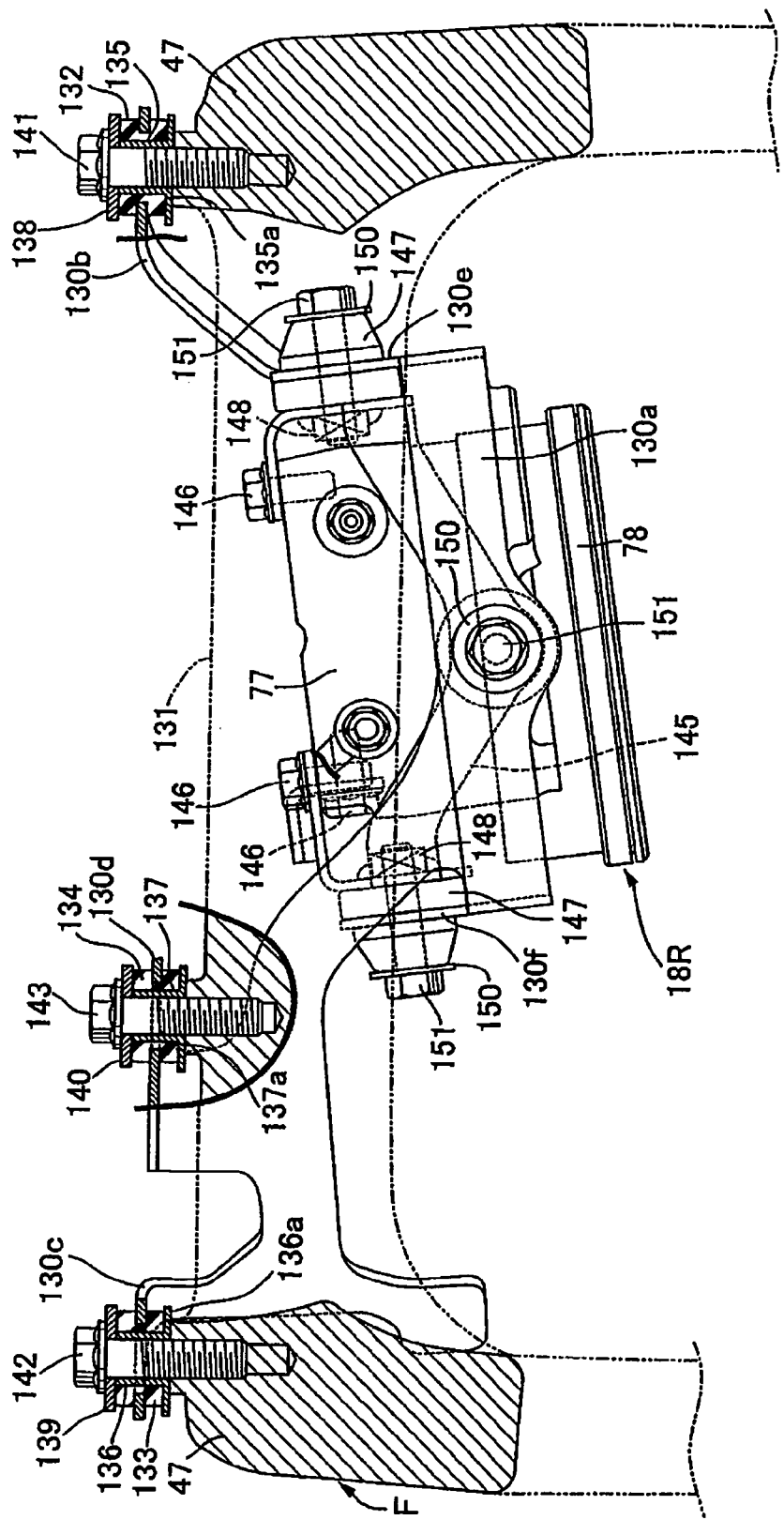
FIG. 15 is a sectional view taken along line 15-15 of FIG. 14.

An arrangement structure of the rear-wheel pressure regulator 18R will be described referring to FIGS. 2 and 14 to 16. First, as shown in FIG. 2, the rear-wheel pressure regulator 18R is arranged on the rear side of the engine body 51 and between an upper end part of the shock absorber 65 and the engine body 51. The rear-wheel pressure regulator 18R is supported by a support member 130, as shown in FIGS. 14 and 15.

The support member 130 includes: a support member main part 130a which is arranged between both the center frames 47, 47 while having a part thereof opposed from above to the rear-wheel pressure regulator 18R disposed on the lower side of a cross member 131 with a base part 77 located on the rear side and with a cover 78 located on the front side; attaching arm parts 130b, 130c, 130d extended from the support member main part 130a so as to be opposed to both the center frames 47, 47 and the back surface of the cross member 131; and a pair of support arm parts 130e, 130f drooping from the support member main part 130a so as to be located on both the left and right sides of the rear-wheel pressure regulator 18R.

Rubber bushings 132, 133, and 134 are mounted to tip parts of the attaching arm parts 130b, 130c, and 130d. Collars 135, 136, and 137 provided at their one-side ends with flange parts 135a, 136a, and 137a projecting outwards are passed through the rubber bushings 132 to 134 so that the flange parts 135a to 137a make contact with the center frames 47, 47 and the back surface of the cross member 131. In addition, washers 138, 139, and 140 are put in contact with the other-side ends of the collars 135 to 137 so that the collars 135 to 137 are clamped between them and the center frames 47, 47 and the cross member 131. Bolts 141, 142, and 143 passed through the washers 138 to 140 and the collars 135 to 137 are screw engaged with the center frames 47, 47 and the cross member 131.

A frame member 145 is attached to an upper part of the support block 77 of the rear-wheel pressure regulator 18R by three bolts 146, 146, and 146, for example. The frame member 145 is disposed between the support member main part 130a and both the support arm parts 130e, 130f of the support member 130, and the rear-wheel pressure regulator 18R. Three portions of the frame member 145 are supported respectively on the support member main part 130a and both the support arm parts 130e, 130f through rubber bushings 147.... Specifically, the upper part of the rear-wheel pressure regulator 18R is attached to the support member 130 through the rubber bushings 147 ... so as to be supported from the support member 130.

Figure 16:
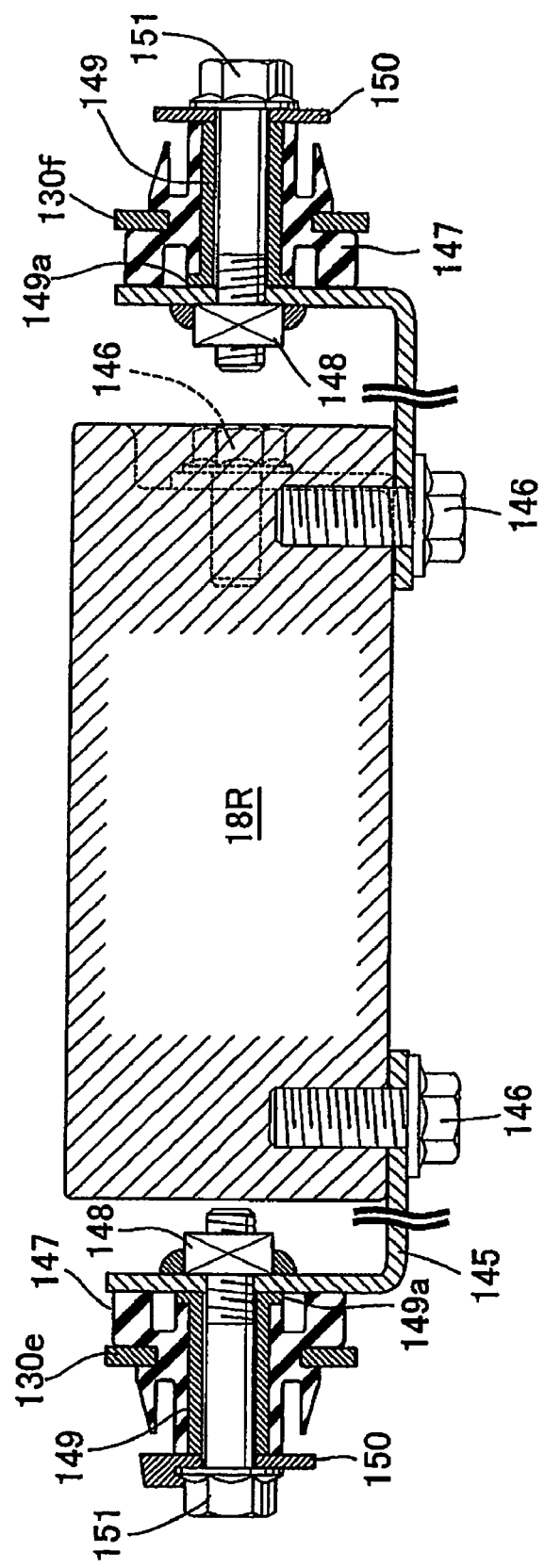
FIG. 16 is a sectional view taken along line 16-16 of FIG. 14.

In FIG. 16, the rubber bushings 147 ... are mounted respectively to the support member main part 130a and both the support arm parts 130e, 130f of the support member 130, and weld nut 148 are securely attached to the frame member 145 in the manner of corresponding to the rubber bushings 147.... In addition, collars 149 ... provided at their one-side ends with flange parts 149a ... projecting outwards are passed through the rubber bushings 147 ... so that the flange parts 149a ... are clamped between them and the support member main part 130a and both the support arm parts 130e, 130f. Besides, washers 150 ... are put in contact with the other-side ends of the collars 149 ... so that the collars 149 ... are clamped between them and the support member main part 130a and both the support arm parts 130e, 130f, and bolts 151 ... passed through the washer 150 ... and the collars 149 ... are screw engaged with the weld nuts 148....

According to the arrangement structure of the rear-wheel pressure regulator 18R as above, the support member 130 for supporting the rear-wheel pressure regulator 18R is flexibly supported by the pair of center frames 47 ... disposed on both the left and right sides of the engine body 51 and by the cross member 131 for connecting the center frame 47 ... to each other on the rear side of the engine body 51 in such a manner as to constitute a part of the body frame F together with the center frames 47 ..., through the rubber bushings 132, 133, and 134. Therefore, vibrations transmitted from the engine E can be prevented from reaching the rear wheel pressure regulator 18R. Moreover, the rigidity of the support member 130 can be set to a level sufficient to hold the rear wheel pressure regulator 18R, without being affected by the rigidity on the side of the body frame F, which makes it unnecessary to enhance the strength of the support member 130 more than required. Thus, reductions in weight and cost can be contrived.

In addition, since the upper part of the rear wheel pressure regulator 18R is so attached as to be suspended from the support member 130, the position of the rear wheel pressure regulator 18R in the width direction of the body frame F can easily be conditioned so as not to interfere with other component parts.

Further, the rear wheel pressure regulator 18R is arranged between the engine body 51 and the upper end part of the shock absorber 95 provided between the swing arm 62 and the link member 64, which constitutes a part of the link mechanism 63 provided between the swing arm 62 and the body frame F. Therefore, the rear wheel pressure regulator 18R can be effectively laid out in the space between the engine body 51 and the upper end part of the shock absorber 65. Moreover, the rear wheel pressure regulator 18R can be protected by surrounding the left and right sides and the front and rear sides of the rear wheel pressure regulator 18R with the body frame F, the engine body 51 and the shock absorber 65.

Rear-Wheel Pressure-Generating Unit 17R

Figure 17:
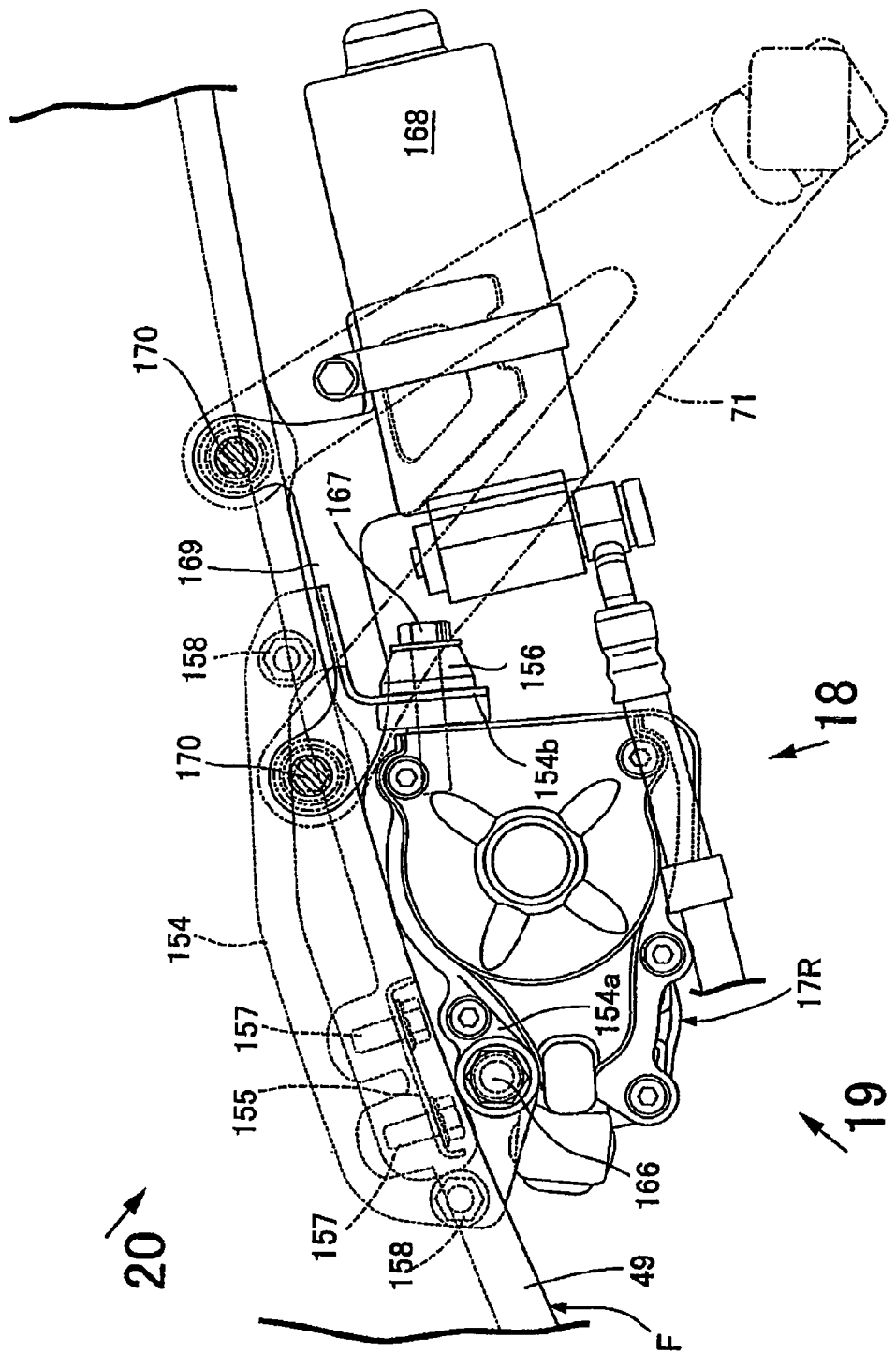
FIG. 17 is an enlarged view of that portion of FIG. 2 which shows the rear-wheel pressure-generating unit and the surroundings thereof.
Figure 18:
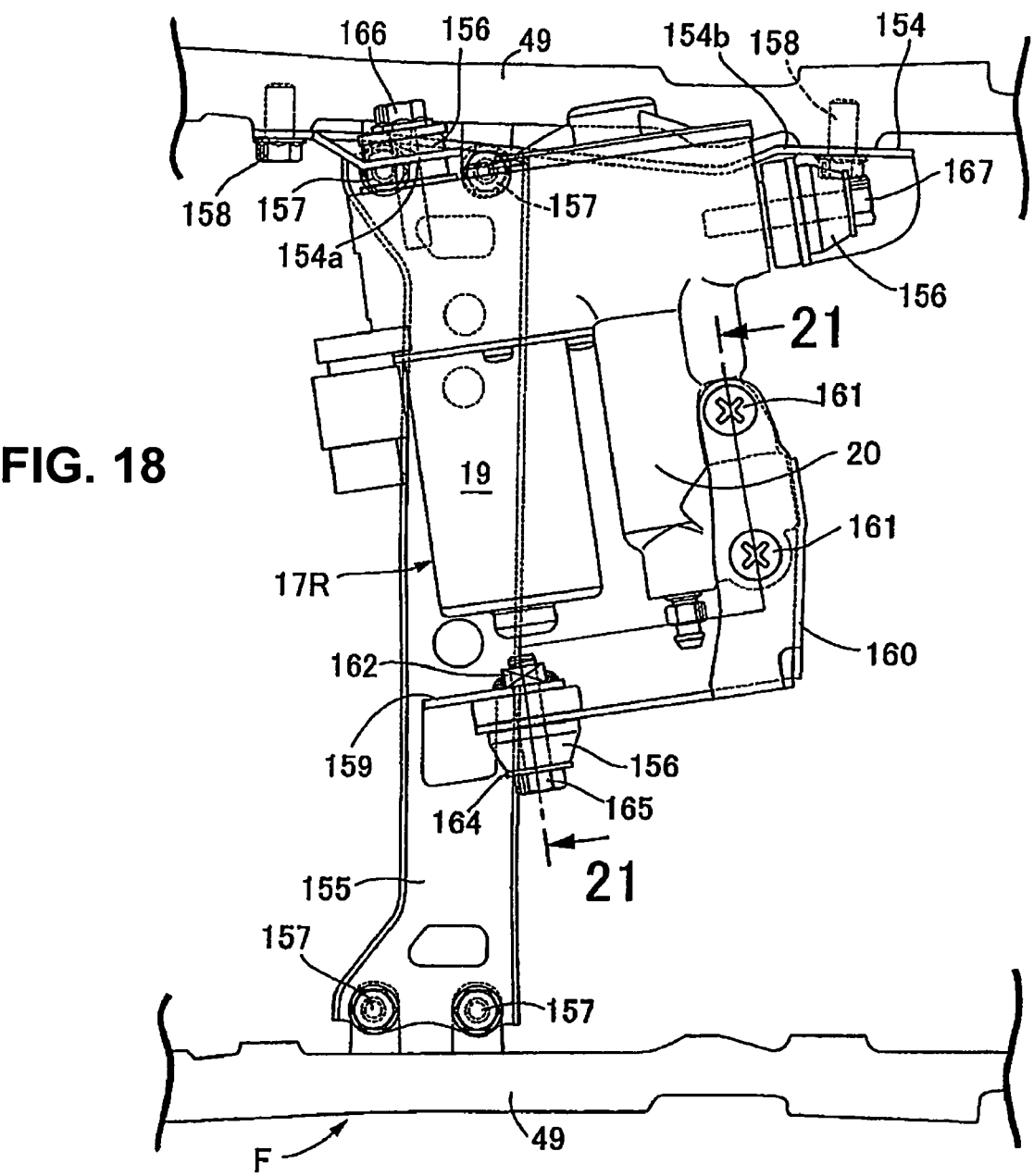
FIG. 18 is a view taken along arrow 18 of FIG. 17.

An arrangement structure of the automated rear pressure generator 17R will be described referring to FIGS. 17 to 21. First, as shown in FIGS. 17 and 18, the automated rear pressure generator 17R is supported on the left-right pair of seat rails 49 . . . constituting a part of the body frame F; in plan view, it is arranged between both the seat rails 49, 49 at a position nearer to the left-side seat rail 49 of both the seat rails 49 . . . .

Figure 19:
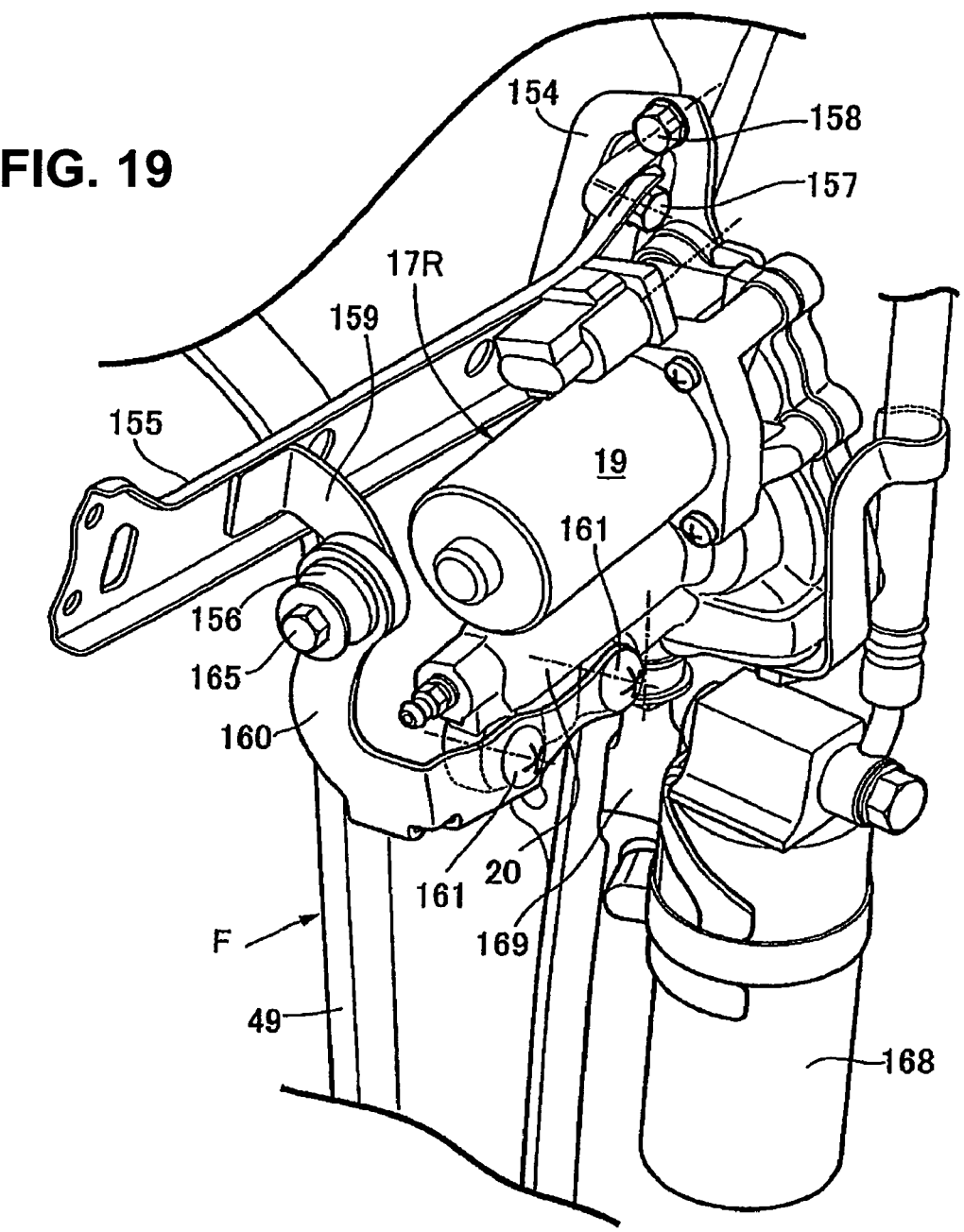
FIG. 19 is a perspective view taken along arrow 19 of FIG. 17.
Figure 20:
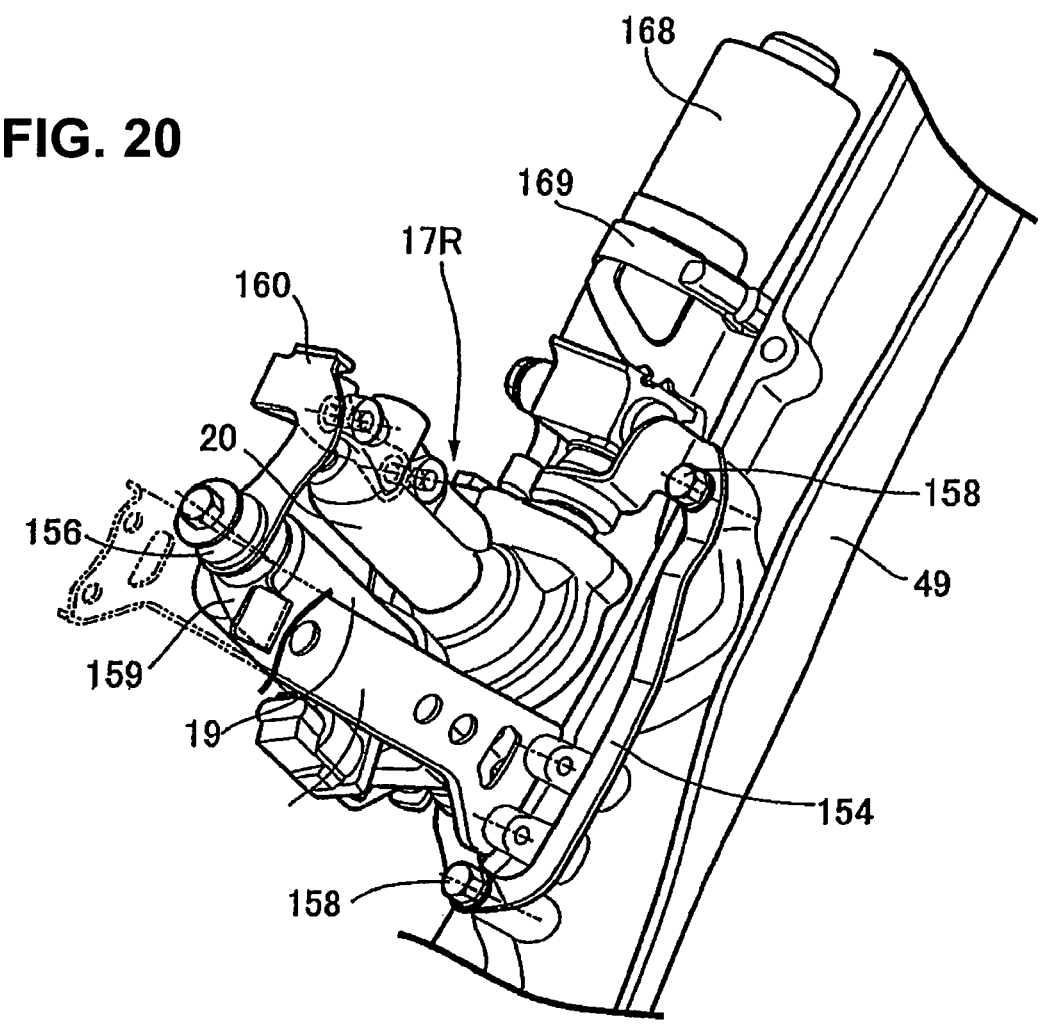
FIG. 20 is a perspective view taken along arrow 20 of FIG. 17.

Referring to FIGS. 19 and 20 also, a first support member 154 is attached to the left-side seat rail 49 of both the seat rails 49 . . . , and the automated rear pressure generator 17R is flexibly supported by the first support member 154 and a cross member 155 for connection between both the seat rails 49 . . . , through rubber bushings 156 . . . .

Both end parts of the cross member 155 are connected to the seat rails 49 . . . by pairs of bolts 157, 157 . . . . Besides, the first support member 154 is fastened to the left-side seat rail 49 by a pair of bolts 158, 158.

A second support member 159 is secured to the cross member 155, and an attaching member 160 fixed to the automated rear pressure generator 17R is supported on the second support member 159 through a rubber bushing 156.

Figure 21:
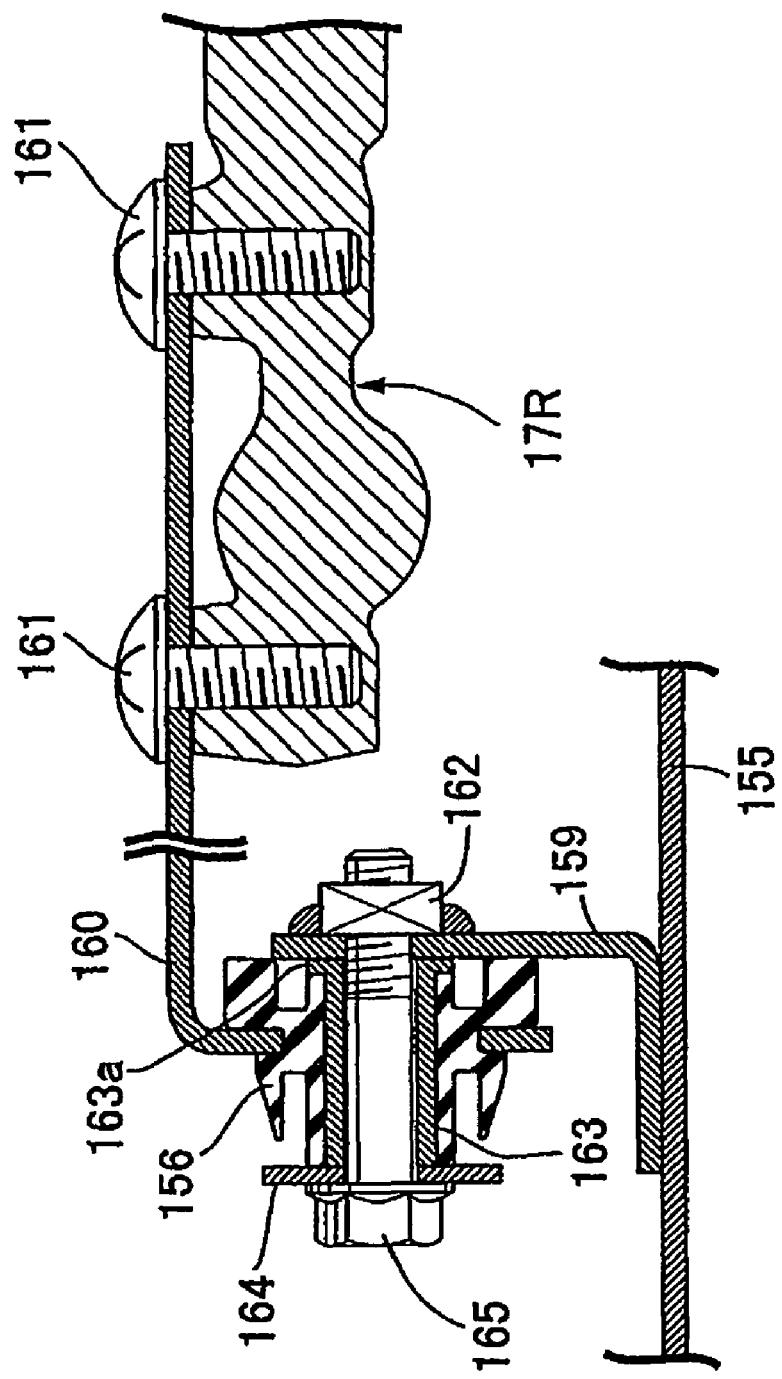
FIG. 21 is a sectional view taken along line 21-21 of FIG. 18.
Figure 22:
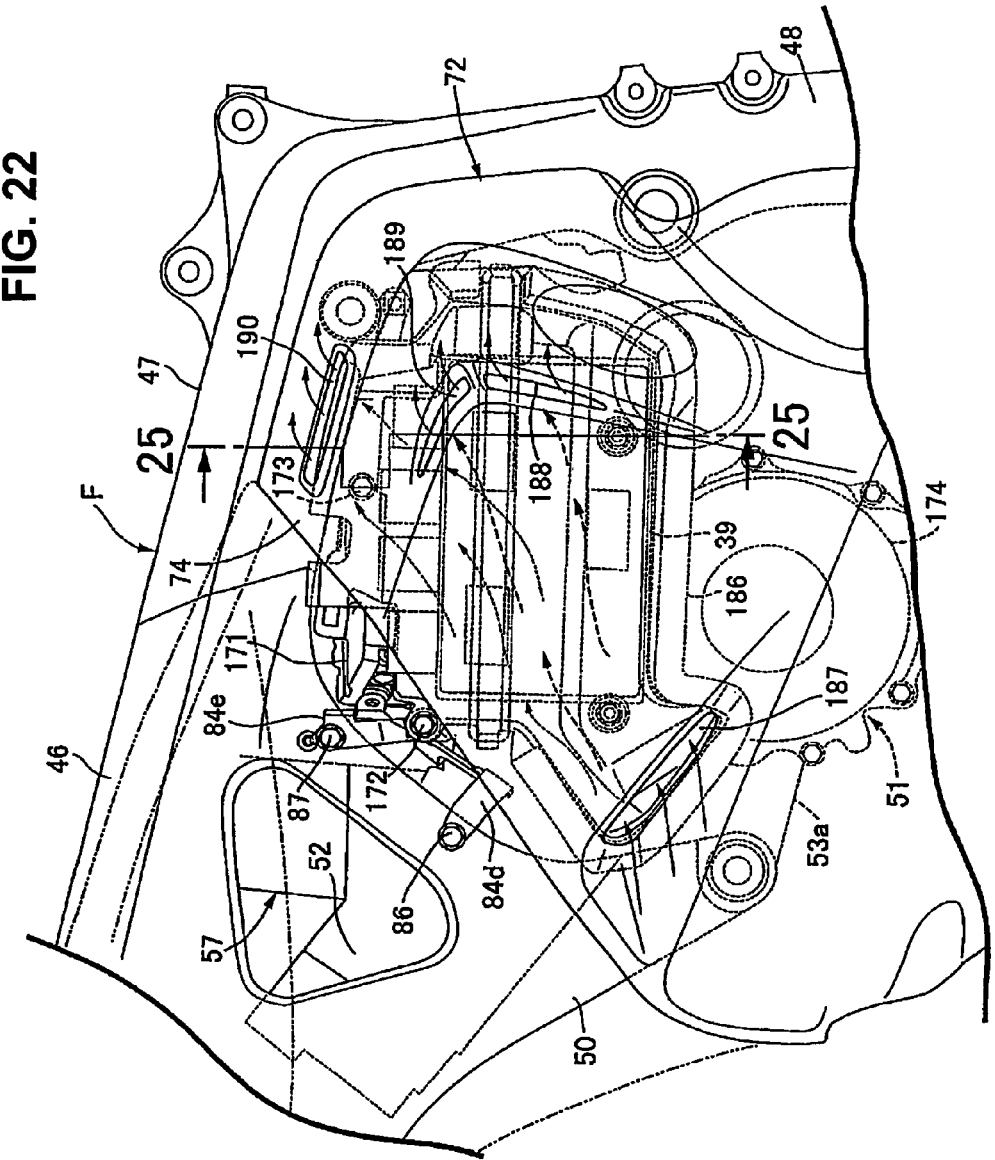
FIG. 22 is an enlarged view of that portion of FIG. 2 which shows a control unit and the vicinity thereof.
Figure 23:
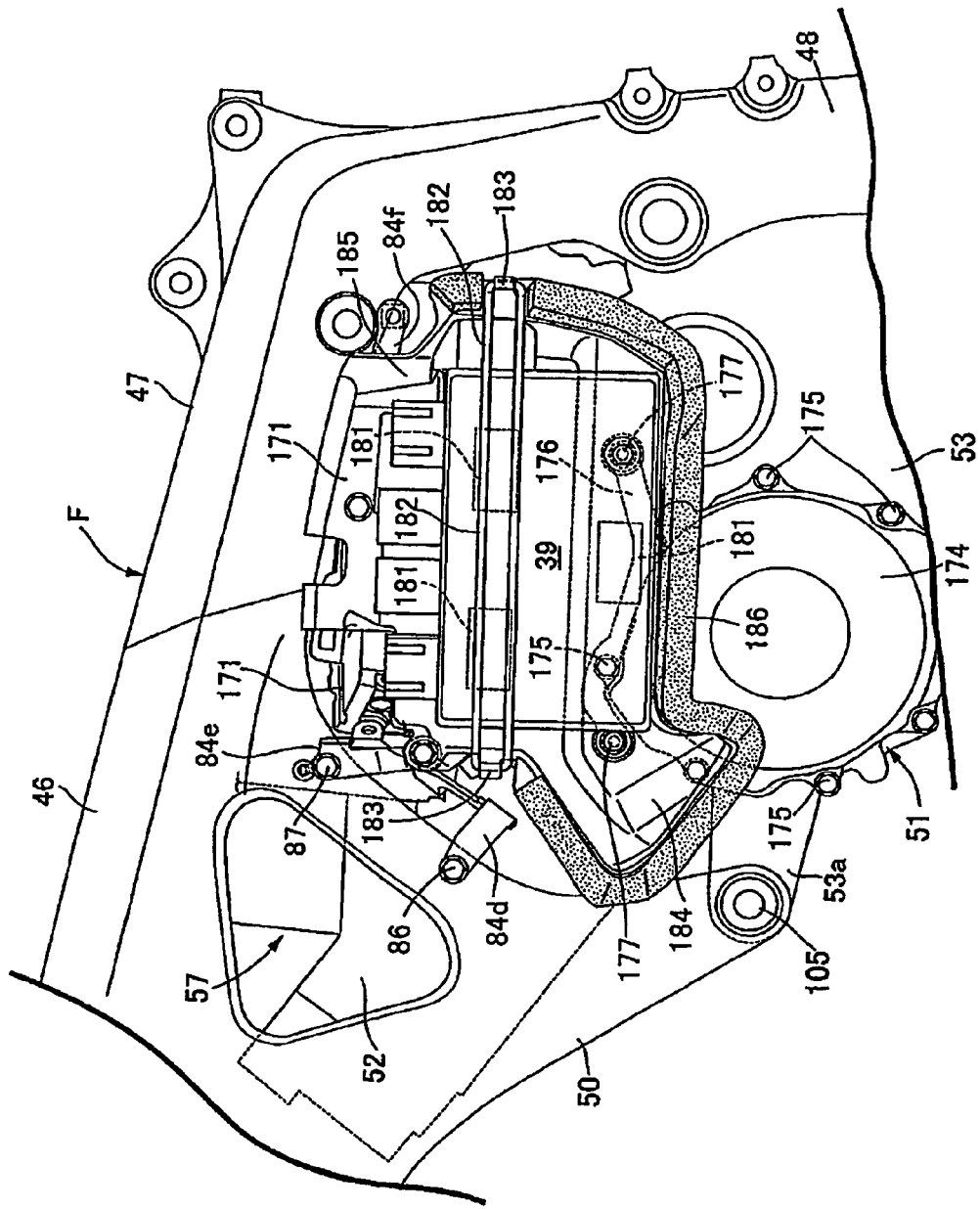
FIG. 23 is a view, corresponding to FIG. 22, showing the condition where a front cowl is removed.
Figure 24:
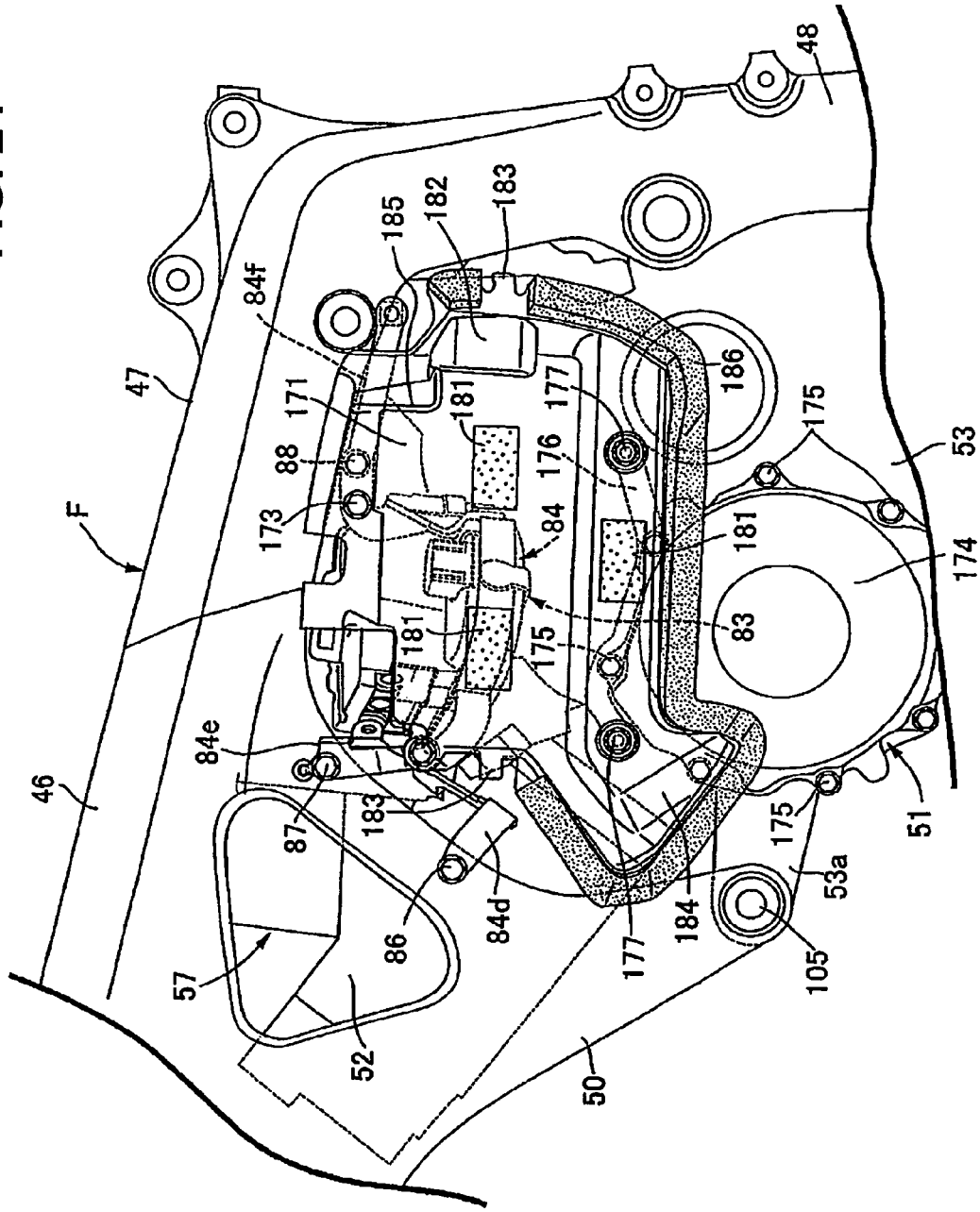
FIG. 24 is a view showing the condition where the control unit is removed from the condition shown in FIG. 23.
Figure 25:
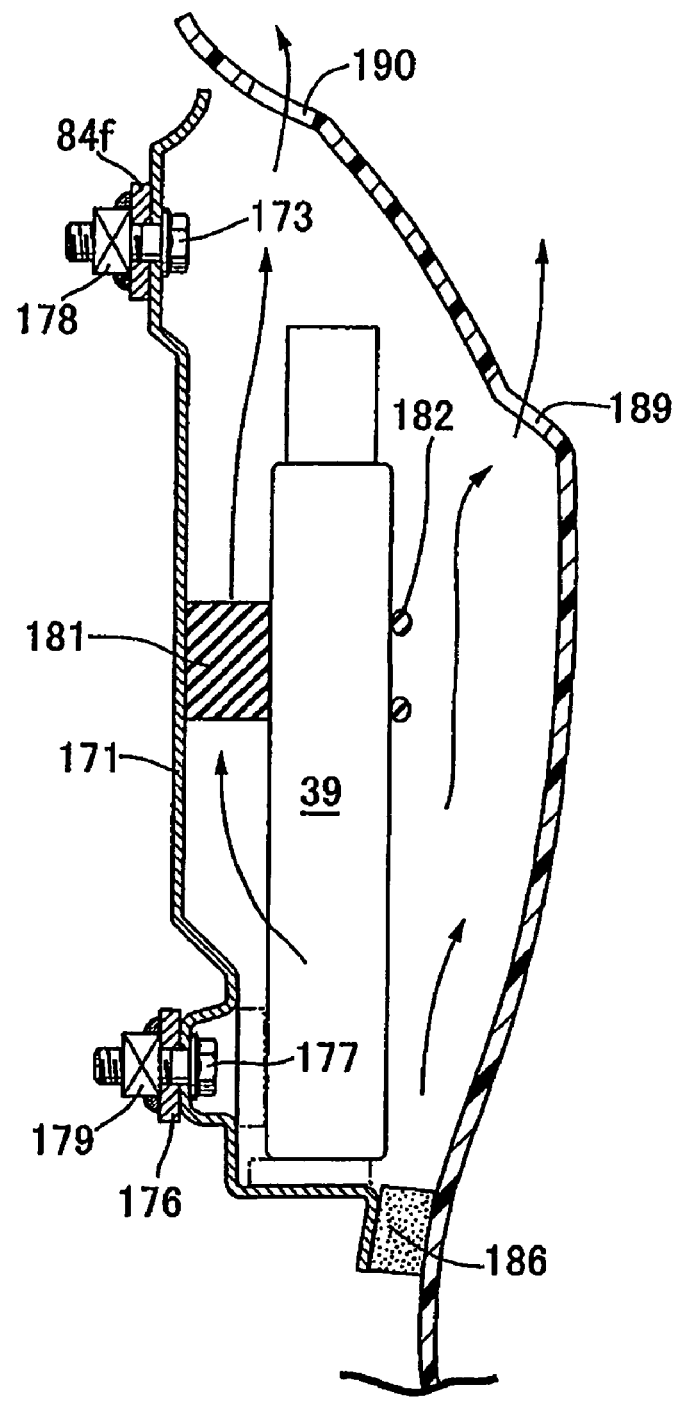
FIG. 25 is a sectional view taken along line 25-25 of FIG. 22.

Referring to FIG. 21 also, the attaching member 160 is firmly attached to the cylinder body 20 of the automated rear pressure generator 17R by a pair of screw members 161, 161, and the rubber bushing 156 is mounted to the attaching member 160. In addition, a weld nut 162 is securely attached to the second support member 159 at a position corresponding to the rubber bushing 156. A collar 163 provided at its one end with a flange part 163a projecting outwards is passed through the rubber bushing 156 so as to put the flange part 163a in contact with the second support member 159. Besides, a washer 164 is put in contact with the other end of the collar 163 so as to clamp the collar 163 between itself and the second support member 159, and a bolt 165 passed through the washer 164 and the collar 163 is screw engaged with the weld nut 162.

In addition, a support plate part 154a opposed to the automated rear pressure generator 17R from the outer side is provided at a front part of the first support member 154, and a support plate part 154b opposed to the automated rear pressure generator 17R from the rear side is provided at a rear part of the first support member 154. The rubber bushings 156, 156 mounted respectively to these lower support bars 154a, 154b are attached to the automated rear pressure generator 17R with bolts 166, 167, by the same attaching structure as that described referring to FIG. 21 above.

Meanwhile, a sub-tank 168 for adjusting the damping force of the shock absorber 65 provided between the swing arm 62 and the link member 64 of the link mechanism 63 is arranged on the rear side of the automated rear pressure generator 17R. The sub-tank 168 is supported by the left-side seat rail 49 of both the seat rails 49 . . . .

Specifically, a sub-tank support member 169 for supporting the sub-tank 168 is fixed to the left-side seat rail 49. The sub-tank support member 169 is fixed to the left-side seat rail 49 with a pair of bolts 170, 170 by co-fastening thereof together with the pillion step 71.

According to the arrangement structure of the automated rear pressure generator 17R as above, the automated rear pressure generator 17R is supported by the left-right pair of seat rails 49, 49 in such a manner as to be laid out between both the seat rails 49 . . . in plan view. Therefore, the automated rear pressure generator 17R can be laid out in the vicinity of the rear-wheel pressure regulator 18R, which is disposed on the rear side of the engine body 51, and in a place where it is easy to secure the space necessary for disposing the automated rear pressure generator 17R.

In addition, the automated rear pressure generator 17R is flexibly supported by the first support member 154 which is attached to the left-side seat rail 49 of both the seat rails 49 . . . and by the cross member 155 for connection between both the seat rails 49 . . . , through the rubber bushings 156 . . . . Therefore, vibrations on the side of the body frame F can be restrained from reaching the automated rear pressure generator 17R.

Besides, the sub-tank 168 for adjusting the damping force of the shock absorber 65 is disposed on the rear side of the automated rear pressure generator 17R and is supported by the left-side seat rail 49. Therefore, it is possible to lay out the automated rear pressure generator 17R between the sub-tank 168 and the engine body 51, and thereby to protect the automated rear pressure generator 17R from external forces.

Furthermore, since the sub-tank support member 169 for supporting the sub-tank 168 is fixed to the left-side seat rail 49 by co-fastening thereof together with the pillion step 71, the number of component parts can be reduced.

Control Unit 39

An arrangement structure of the control unit 39 will be described referring to FIGS. 22 to 25. The control unit 39 is arranged on the left side of the engine body 51 mounted on the body frame F. Moreover, in order to enhance the property for "knee gripping" by the driver, the control unit 39 is disposed on the inner side relative to the vehicle body side ends of that portion of the motorcycle at which the vehicle width is the largest. The control unit 39 is contained in and supported by a synthetic resin-made control unit support case 171 interposed between the control unit 39 and the engine body 51, and is covered with the side cover part 74 constituting a part of the front cowl 72.

The control unit support case 171 is formed in a box-like shape opened on the side opposite to the engine body 51 so as to contain the control unit 39 on the side opposite to the engine body 51. Meanwhile, the front pressure-regulating unit 18F supported on the body frame F through the support cage 83 is arranged on the inner side relative to the control unit support case 171, and an upper part of the control unit support case 171 is attached to the support arm parts 84e, 84f possessed by the lower cage body 84 constituting a part of the support cage 83, by bolts 172, 173. Specifically, as clearly shown in FIG. 25, weld nuts 178 . . . are secured to the support arm parts 84e, 84f, and the bolts 172, 173 passed through the control unit support case 171 and the support arm parts 84e, 84f are screw engaged with the weld nuts 178 . . . .

Meanwhile, a crankcase cover 174 such as a generator cover is fastened to a left side surface of the crankcase 53 constituting a part of the engine body 51, by a plurality of bolts 175, 175 . . . . To a lower support member 176 which is co-fastened to the crankcase 53 together with the crankcase cover 174 by use of one of the bolts 175, 175 . . . , a lower part of the above-mentioned control unit support case 171 is attached by a pair of bolts 177, 177. Specifically, as clearly shown in FIG. 25, a pair of weld nuts 179 . . . are firmly attached to the lower support member 176, and the bolts 177 . . . passed through the control unit support case 171 and the lower support member 176 are screw engaged with the weld nuts 179 . . . .

The control unit 39 is contained in the control unit support case 171 with, for example, three resilient plastic members 181 . . . interposed between itself and the control unit support case 171. The control unit 39 is supported on the control unit support case 171 through a fixing member 182 which is put in elastic contact with an outside surface of the control unit 39 along the front-rear direction of the body frame F and which is detachably attached to the control unit support case 171. The fixing member 182 may be, for example, an endlessly continuous rubber string, which is disengageably engaged with lock parts 182, 182 provided at the control unit support case 171 at positions on the front and rear sides of the control unit 39.

The control unit support case 171 is provided with a running airflow leading-in part 184 for permitting the running airflow to pass to the side of the control unit 39, the running airflow inlet port 184 being located on the lower front side of the control unit 39, and also with a running airflow leading-out part 185 for leading out the running airflow having passed through the lateral sides of the control unit 39, the running airflow leading-out part 185 being located on the upper rear side of the control unit 39.

The side cover part 74 of the front cowl 72 covers the control unit 39, with a cushion member 186 between itself and a lower part of the control unit support case 171. The side cover part 74 is provided with a running airflow intake port 187 at its portion corresponding to the running airflow leading-in part 184, and with running airflow exhaust ports 188, 189, and 190 at its portions corresponding to the running airflow leading-out part 185.

According to the arrangement structure of the control unit 39 as above, the control unit 39 arranged on a lateral side of the engine body 51 is contained in and supported by the control unit support case 171 interposed between the control unit 39 and the engine body 51. Therefore, direct reach of the heat from the engine body 51 to the control unit 39 can be avoided by the control unit support case 171 interposed between the control unit 39 and the engine body 51, while permitting the control unit 39 to be disposed in the vicinity of the engine body 51.

Moreover, the running airflow leading-in part 184 for permitting the running airflow to pass to the side of the control unit 39 is formed at a front part of the control unit support case 171, and the running airflow leading-out part 185 for leading out the running airflow having passed through the lateral sides of the control unit 39 is formed at a rear part of the control unit support case 171. Therefore, during running of the motorcycle, the running airflow can be caused to pass through the lateral sides of the control unit 39, thereby cooling the control unit 39.

In addition, an upper part of the control unit support case 171 is attached to the support arm parts 84e, 84f possessed by the support cage 83 for supporting the front pressure-regulating unit 18F on the body frame F. Therefore, the component parts and members for supporting the front pressure-regulating unit 18F and the control unit support case 171 onto the body frame F can be made to be suited to common use, which contributes to a reduction in the number of component parts.

Besides, a lower part of the control unit support case 171 is attached to the lower support member 176 which is co-fastened to the crankcase 53 together with the crankcase cover 174 fastened to one side of the crankcase. Therefore, the bolts 175 for fastening the lower support member 176 to the side of the crankcase 53 can be used in common to the fastening of the crankcase cover 174, which contributes to a reduction in the number of component parts.

In addition, the control unit 39 accompanied by the plurality of resilient plastic members 181 . . . interposed between itself and the control unit support case 171 is supported on the control unit support case 171 by the fixing member 182 which is put in elastic contact with the outside surface of the control unit 39 along the front-rear direction of the body frame F and which is detachably attached to the control unit support case 171. Therefore, the fixing member 182 can be attached and detached easily, whereby maintainability of the control unit 39 can be enhanced.

Furthermore, the control unit 39 is covered with the side cover part 74 constituting a part of the front cowl 72, and the running airflow intake port 187 and the running airflow exhaust ports 188, 189, and 190 are provided at portions corresponding to the running airflow leading-in part 184 and the running airflow leading-out part 185 of the side cover part 74. Therefore, the running airflow can be introduced from the exterior into the running airflow leading-in part 184 and can be exhausted from the running airflow leading-out part 185, whereby performance of cooling the control unit 39 is maintained, and, at the same time, the control unit 39 is covered with the side cover part 74, whereby the control unit 39 can be protected from externally coming foreign matter, rainwater, etc.

While the embodiment of the present invention has been described above, the invention is not limited to the embodiment, and various design modifications are possible without departure from the invention as described in claims.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a motorcycle including:
a body frame;
an engine mounted on said body frame, said engine comprising an engine body and a cylinder head which is on an upper side of said engine body;
a fuel tank disposed above an intake system which is connected to and which extends upwardly from said cylinder head;
a wheel brake; and
a manually operable brake operating element which is fluidly connected to said wheel brake;
the improvement comprising a brake-by wire system comprising:
an operation amount detector for detecting an amount of force applied to the brake operating element;
a pressure-generating unit for generating a hydraulic pressure separately from an operation of said brake operating element,
a pressure-regulating unit interposed between said hydraulic pressure generating mechanism and the wheel brake, and operable to regulate an output hydraulic pressure of said automated hydraulic pressure generating mechanism and to apply the regulated hydraulic pressure to said wheel brake, the pressure-regulating unit comprising a substantially box-shaped block having a plurality of components embedded therein, and a plastic cover member attached to the block and covering outwardly-projecting parts of the components embedded in said block, wherein the cover member comprises an integral terminal connector for matingly engaging a corresponding connector therein, and
a control unit for controlling operation of said pressure-regulating unit on the basis of input from said operating amount detector, said control unit also operable to control operation of said pressure-generating unit;
wherein said pressure-regulating unit is disposed between said engine body and said fuel tank; and wherein said pressure-regulating unit is flexibly supported, through a flexibly resilient member, by a support member which is operatively attached to said body frame, said flexibly resilient member comprising a two-part case including an upper case member and a lower case member which cooperates with the upper case member to substantially surround the block, and wherein said lower case member comprises a plurality of integrally formed spaced apart, substantially L-shaped corner projections for supporting said pressure regulating unit thereon.

2. The motorcycle as set forth in claim 1, wherein said support member comprises a cage structure comprising:
a lower cage body portion which is attached to said body frame and configured to receive a lower part of said pressure-regulating unit, and to support a lower side of said pressure-regulating unit therein; and
an upper cage body portion which is fastened to said lower cage body portion,
said pressure-regulating unit being clamped between said lower and upper cage body portions through said flexibly resilient member.

3. The motorcycle as set forth in claim 2, wherein the support member comprises:
a lower cage body comprising:
a first cage part extending outside of a side portion of the pressure-regulating unit;
at least one lower support bar connected to a lower side of the first cage part; and
a plurality of attachment parts extending outwardly from the first cage part for use in attaching the upper cage body to the lower cage body; and
an upper cage body comprising:
a upper bar for placement above the pressure-regulating unit; and
a plurality of attachment parts extending outwardly from the upper bar for attaching to the respective attachment parts of the lower cage body.

4. The motorcycle as set forth in claim 1, wherein the pressure-regulating unit comprises:
a first solenoid valve interposed between the brake operating element and the wheel brake;
a second solenoid valve interposed between the pressure-generating unit and the wheel brake;
a stroke simulator for providing feedback to the brake operating element when the first solenoid valve is closed;
a first one-way check valve for selectively allowing fluid pressure from the pressure-generating unit to reach the wheel brake when the second solenoid valve is closed;
a second one-way check valve interposed between the brake operating element and the first solenoid valve; and
first and second pressure sensors.

5. The motorcycle as set forth in claim 1, wherein the block is formed from an aluminum alloy.

6. The motorcycle as set forth in claim 1, wherein the upper case member has a cutout formed therein to provide access to the terminal connector.

7. The motorcycle as set forth in claim 1, further comprising exhaust pipes which extend forwardly and downwardly from a front surface of the cylinder head, and then turn to extend rearwardly in a manner such that a hollow space is formed between the exhaust pipes and a front surface of the engine body, wherein the pressure-generating unit is disposed in said hollow space.

8. In a motorcycle including:
a body frame;
an engine mounted on said body frame, said engine comprising an engine body and a cylinder head which is on an upper side of said engine body;
a fuel tank disposed above an intake system which is connected to and which extends upwardly from said cylinder head;
a wheel brake;
a manually operable brake operating element which is fluidly connected to said wheel brake;
the improvement comprising a brake-by wire system comprising:
an operation amount detector for detecting an amount of force applied to the brake operating element;
a pressure-generating unit for generating a hydraulic pressure separately from an operation of said brake operating element,
a pressure-regulating unit interposed between said hydraulic pressure generating mechanism and the wheel brake, and operable to regulate an output hydraulic pressure of said automated hydraulic pressure generating mechanism and to apply the regulated hydraulic pressure to said wheel brake, the pressure-regulating unit comprising a substantially box-shaped block having a plurality of components embedded therein, and a plastic cover member attached to the block and covering outwardly-projecting parts of the components embedded in said block; and
a control unit for controlling operation of said pressure-regulating unit on the basis of input from said operating amount detector, said control unit also operable to control operation of said pressure-generating unit;
wherein said pressure-regulating unit is disposed between said engine body and said fuel tank; and
wherein said pressure-regulating unit is flexibly supported, through a flexibly resilient member, by a support member which is operatively attached to said body frame, said flexibly resilient member comprising a two-part case which fits into said support member, said case including an upper case member and a lower case member which cooperates with the upper case member to substantially surround the pressure-regulating unit.

9. The motorcycle as set forth in claim 8, wherein said support member comprises a cage structure comprising:
a lower cage body portion which is attached to said body frame and configured to substantially cover a lower part of said pressure-regulating unit and to support said pressure-regulating unit therein on a lower side thereof; and
an upper cage body portion which is fastened to said lower cage body portion,
said pressure-regulating unit being clamped between said lower and upper cage body portions through said flexibly resilient member.

10. The motorcycle as set forth in claim 8, wherein the pressure-regulating unit comprises:
a first solenoid valve interposed between the brake operating element and the wheel brake;
a second solenoid valve interposed between the pressure-generating unit and the wheel brake;
a stroke simulator for providing feedback to the brake operating element when the first solenoid valve is closed;
a first one-way check valve for selectively allowing fluid pressure from the pressure-generating unit to reach the wheel brake when the second solenoid valve is closed;

a second one-way check valve interposed between the brake operating element and the first solenoid valve; and first and second pressure sensors.

11. The motorcycle as set forth in claim 8, wherein the block is formed from an aluminum alloy.

12. The motorcycle as set forth in claim 8, wherein said cover member comprises a terminal connector for matingly engaging a corresponding connector therein.

13. The motorcycle as set forth in claim 8, wherein the support member comprises:
a lower cage body comprising:
a first cage part extending outside of a side portion of the pressure-regulating unit;
at least one lower support bar connected to a lower side of the first cage part; and
a plurality of attachment parts extending outwardly from the first cage part for use in attaching the upper cage body to the lower cage body; and
an upper cage body comprising:
a upper bar for placement above the pressure-regulating unit; and
a plurality of attachment parts extending outwardly from the upper bar for attaching to the respective attachment parts of the lower cage body.

14. The motorcycle as set forth in claim 12, wherein the upper case member has a cutout formed therein to provide access to the terminal connector.

15. The motorcycle as set forth in claim 8, wherein said lower case member comprises a plurality of integrally formed spaced apart, substantially L-shaped corner projections for supporting said pressure regulating unit thereon.

16. The motorcycle as set forth in claim 8, further comprising exhaust pipes which extend forwardly and downwardly from a front surface of the cylinder head, and then turn to extend rearwardly in a manner such that a hollow space is formed between the exhaust pipes and a front surface of the engine body, wherein the pressure-generating unit is disposed in said hollow space.

* * * * *